United States Patent
Hashimoto et al.

(10) Patent No.: US 8,918,654 B2
(45) Date of Patent: Dec. 23, 2014

(54) INFORMATION PROCESSING DEVICE, PROGRAM VERIFICATION METHOD, AND RECORDING MEDIUM

(75) Inventors: Mikio Hashimoto, Kanagawa (JP); Hiroyoshi Haruki, Kanagawa (JP); Yurie Fujimatsu, Kanagawa (JP); Takeshi Kawabata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1593 days.

(21) Appl. No.: 12/274,024

(22) Filed: Nov. 19, 2008

(65) Prior Publication Data

US 2009/0138729 A1 May 28, 2009

(30) Foreign Application Priority Data

Nov. 22, 2007 (JP) .................. 2007-303765

(51) Int. Cl.
 *G06F 15/16* (2006.01)
 *G06F 12/14* (2006.01)
 *G06F 21/54* (2013.01)

(52) U.S. Cl.
 CPC ............ *G06F 12/1416* (2013.01); *G06F 21/54* (2013.01)
 USPC .......................................... 713/193; 709/203

(58) Field of Classification Search
 None
 See application file for complete search history.

(56) References Cited

U.S. PATENT DOCUMENTS

| | | | |
|---|---|---|---|
| 6,470,450 B1 * | 10/2002 | Langford et al. | 713/182 |
| 6,983,374 B2 * | 1/2006 | Hashimoto et al. | 713/194 |
| 7,065,215 B2 | 6/2006 | Shirakawa et al. | |
| 7,080,037 B2 * | 7/2006 | Burger et al. | 705/50 |
| 7,114,053 B2 * | 9/2006 | Goss | 711/203 |
| 7,136,488 B2 | 11/2006 | Hashimoto et al. | |
| 7,143,436 B2 | 11/2006 | Yamaguchi et al. | |
| 7,219,369 B2 | 5/2007 | Hashimoto et al. | |
| 7,270,193 B2 | 9/2007 | Hashimoto et al. | |
| 7,299,363 B2 | 11/2007 | Yamaguchi et al. | |
| 7,424,622 B2 | 9/2008 | Hashimoto et al. | |
| 2002/0053024 A1 | 5/2002 | Hashimoto et al. | |
| 2003/0033537 A1 | 2/2003 | Fujimoto et al. | |
| 2003/0050962 A1 * | 3/2003 | Monsen et al. | 709/203 |
| 2003/0126458 A1 | 7/2003 | Teramoto et al. | |

(Continued)

FOREIGN PATENT DOCUMENTS

JP 2004-240536 8/2004

OTHER PUBLICATIONS

Asian Askarov, et al., "Cryptographically-Masked Flows", Proceedings of the International Static Analysis Symposium, LNCS, 4134s, Aug. 2006, pp. 1-17.

(Continued)

*Primary Examiner* — Azizul Choudhury
(74) *Attorney, Agent, or Firm* — Oblon, Spivak, McClelland, Maier & Neustadt, L.L.P.

(57) ABSTRACT

A first storage unit stores a plurality of security functions each defining a first protection attribute requiring a storage of a value of an argument for input/output of data. A second storage unit stores a program list describing a second protection attribute of a variable indicating a storage area of the data and an executing procedure of a predetermined process. An identifying unit identifies a third protection attribute of an actual argument for input/output of a security function based on the second protection attribute. When a judging unit judges not all of third protection attributes match with first protection attributes, an output unit outputs error information indicating a mismatch of the protection attributes.

17 Claims, 25 Drawing Sheets

(56) References Cited

U.S. PATENT DOCUMENTS

| | | |
|---|---|---|
| 2004/0015958 A1* | 1/2004 | Veil et al. .................. 717/174 |
| 2004/0030911 A1 | 2/2004 | Isozaki et al. |
| 2004/0187019 A1 | 9/2004 | Nanki et al. |
| 2005/0105738 A1 | 5/2005 | Hashimoto |
| 2005/0144438 A1 | 6/2005 | Hashimoto et al. |
| 2005/0259465 A1* | 11/2005 | Yoshida et al. .......... 365/185.03 |
| 2005/0289397 A1 | 12/2005 | Haruki et al. |
| 2006/0005260 A1 | 1/2006 | Haruki et al. |
| 2006/0010308 A1 | 1/2006 | Haruki et al. |
| 2007/0050619 A1 | 3/2007 | Miyamori et al. |

OTHER PUBLICATIONS

Mikio Hashimoto, et al., "Secure Processor Consistent with Both Foreign Software Protection and User Privacy Protection", Proceedings of Security Protocols Workshop 2004, LNCS 3957, pp. 276-286.

Li Gong, et al., "Reasoning about Belief in Cryptographic Protocols", Proceedings 1990 IEEE Symposium on Research in Security and Privacy, May 1990, 14 pages.

Mikio Hashimoto, et al., "Multi-vendor Secure Processor Under a Hostile Operating System", vol. 45 No. SIG 3(ACS 5), Mar. 2004, 11 pages.

* cited by examiner

FIG.6

| ATTRIBUTE | ALTERATION PREVENTION (MEMORY) | ALTERATION PREVENTION (PRIVACY) | INTEGRITY VERIFICATION (SEMANTIC) | CONFIDENTIALITY (SEMANTIC) |
|---|---|---|---|---|
| EXPOSED | − | − | × | × |
| FIXED | + | ± | × | × |
| VERIFIED | + | ± | ○ | × |
| HIDDEN | ± | + | × | × |
| CONCEALED | ± | + | × | ○ |
| CONFIDENTIAL | + | + | ○ | ○ |

FIG.7

| FROM \ TO | EXPOSED | FIXED | VERIFIED | HIDDEN | CONCEALED | CONFIDENTIAL |
|---|---|---|---|---|---|---|
| EXPOSED | ○ | ○ | × | × | × | × |
| FIXED | ○ | ○ | × | × | × | × |
| VERIFIED | ○ | ○ | ○ | × | × | × |
| HIDDEN | × | × | × | ○ | × | × |
| CONCEALED | × | × | × | × | ○ | × |
| CONFIDENTIAL | × | × | × | × | × | ○ |

FIG.8

| LARGE CLASSIFICATIONS | MIDDLE CLASSIFICATIONS | SECURITY FUNCTION NAME | SUPPLEMENTARY CLASSIFICATIONS | INPUT TYPE | INPUT PROTECTION ATTRIBUTE | KEY VALUE (SPECIAL INPUT) TYPE | KEY VALUE PROTECTION ATTRIBUTE | OUTPUT TYPE | OUTPUT PROTECTION ATTRIBUTE | SUPPLEMENTARY OUTPUT TYPE | SUPPLEMENTARY OUTPUT PROTECTION ATTRIBUTE |
|---|---|---|---|---|---|---|---|---|---|---|---|
| PUBLIC KEY ENCRYPTIONS | PUBLIC KEY ENCRYPTIONS | PublicEncrypt XXX | PUBLIC KEY ENCRYPTIONS A | PLAIN TEXT | CONFIDENTIAL | PUBLIC KEY | VERIFIED | CRYPTOGRAM | VERIFIED | | |
| | | PublicEncrypt XXX | PUBLIC KEY ENCRYPTIONS B | PLAIN TEXT | CONCEALED | PUBLIC KEY | VERIFIED | CRYPTOGRAM | EXPOSED | | |
| | PUBLIC KEY DECRYPTION | PublicDecrypt XXX | PUBLIC KEY DECRYPTION A | CRYPTOGRAM | VERIFIED | PRIVATE KEY | CONFIDENTIAL | PLAIN TEXT | CONFIDENTIAL | | |
| | | PublicDecrypt XXX | PUBLIC KEY DECRYPTION B | CRYPTOGRAM | EXPOSED | PRIVATE KEY | CONFIDENTIAL | PLAIN TEXT | CONCEALED | | |
| PUBLIC KEY SIGNATURES | PUBLIC KEY SIGNATURES GENERATION | PublicSign XXX | PUBLIC KEY SIGNATURES A | INPUTTED TEXT | CONFIDENTIAL | PRIVATE KEY | CONFIDENTIAL | SIGNATURES | CONFIDENTIAL | | |
| | | PublicSign XXX | PUBLIC KEY SIGNATURES B | INPUTTED TEXT | VERIFIED | PRIVATE KEY | CONFIDENTIAL | SIGNATURES | VERIFIED | | |
| | PUBLIC KEY SIGNATURES VERIFICATION | PublicVerify XXX | PUBLIC KEY SIGNATURES VERIFICATION A | SIGNATURES | CONCEALED | PUBLIC KEY | VERIFIED | PLAIN TEXT | CONFIDENTIAL | RESULT | CONFIDENTIAL |
| | | PublicVerify XXX | PUBLIC KEY SIGNATURES VERIFICATION B | SIGNATURES | EXPOSED | PUBLIC KEY | VERIFIED | PLAIN TEXT | VERIFIED | RESULT | VERIFIED |
| COMMON KEY ENCRYPTIONS | COMMON KEY ENCRYPTIONS | CommonEncrypt YYY | PRIVATE KEY ENCRYPTIONS A | PLAIN TEXT | CONFIDENTIAL | PRIVATE KEY | CONFIDENTIAL | CRYPTOGRAM | VERIFIED | | |
| | | CommonEncrypt YYY | PRIVATE KEY ENCRYPTIONS B | PLAIN TEXT | CONCEALED | PRIVATE KEY | CONFIDENTIAL | CRYPTOGRAM | EXPOSED | | |
| | COMMON KEY DECRYPTION | CommonDecrypt YYY | PRIVATE KEY DECRYPTION A | CRYPTOGRAM | VERIFIED | PRIVATE KEY | CONFIDENTIAL | PLAIN TEXT | CONFIDENTIAL | | |
| | | CommonDecrypt YYY | PRIVATE KEY DECRYPTION B | CRYPTOGRAM | EXPOSED | PRIVATE KEY | CONFIDENTIAL | PLAIN TEXT | CONCEALED | | |
| COMMON KEY SIGNATURES | COMMON KEY SIGNATURES GENERATION | MACSgn YYY | PRIVATE KEY SIGNATURES A | INPUTTED TEXT | CONFIDENTIAL | PRIVATE KEY | CONFIDENTIAL | SIGNATURES | CONFIDENTIAL | | |
| | | MACSgn YYY | PRIVATE KEY SIGNATURES B | INPUTTED TEXT | VERIFIED | PRIVATE KEY | CONFIDENTIAL | SIGNATURES | VERIFIED | | |
| | COMMON KEY SIGNATURES VERIFICATION | MACVerify YYY | PRIVATE KEY SIGNATURES VERIFICATION A | SIGNATURES | CONCEALED | PRIVATE KEY | CONFIDENTIAL | PLAIN TEXT | CONFIDENTIAL | RESULT | CONFIDENTIAL |
| | | MACVerify YYY | PRIVATE KEY SIGNATURES VERIFICATION B | SIGNATURES | EXPOSED | PRIVATE KEY | CONFIDENTIAL | PLAIN TEXT | VERIFIED | RESULT | VERIFIED |
| RANDOM NUMBER GENERATION FUNCTION | PHYSICAL RANDOM NUMBER | PseudoRandom | PHYSICAL RANDOM NUMBER A | — | | — | | RANDOM NUMBER | CONFIDENTIAL | | |
| | | PseudoRandom | PHYSICAL RANDOM NUMBER B | — | | — | | RANDOM NUMBER | CONCEALED | | |
| | | PseudoRandom | PHYSICAL RANDOM NUMBER C | — | | — | | RANDOM NUMBER | VERIFIED | | |

FIG. 9

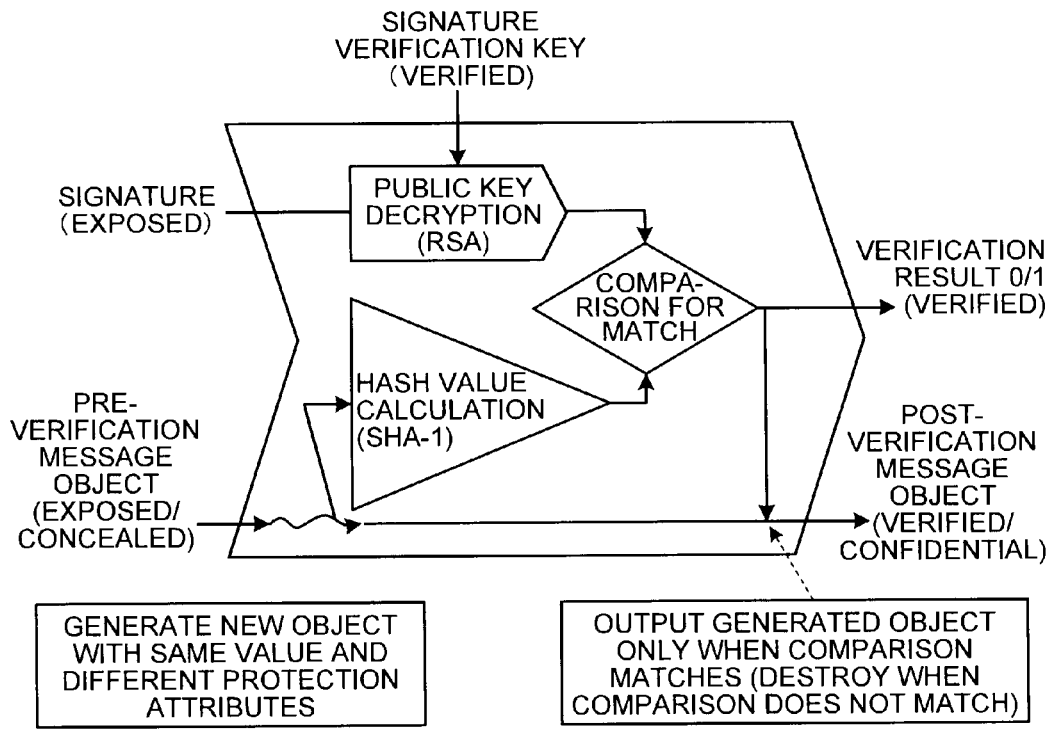

FIG. 10A

| NAME | PROTECTION ATTRIBUTE | FUNCTION |
|---|---|---|
| INPUT | ONLY EXPOSED | STORE DATA TO INPUT BUFFER AND ACQUIRE DATA SIZE BY OS API CALL |
| OUTPUT | EXPOSED OR VERIFIED | STORE DATA TO SIZE-SPECIFIC DATA OUTPUT BUFFER AND CALL OS |

FIG. 10B

| NAME | PROTECTION ATTRIBUTE | FUNCTION |
|---|---|---|
| EXTRACT | SAME FOR ALL ARGUMENTS (OVERLOAD) | COPY DATA SPECIFIED BY PARAMETERS FROM INPUT TO OUTPUT |
| CONCAT | SAME FOR ALL ARGUMENTS (OVERLOAD) | COPY COMBINED RESULT OF TOW INPUTS TO OUTPUT |

FIG.11

```
1:      // INITIAL DATA
2:          const verified    PubKey_RSA  PubKey_CA
3:          const confidential PrvKey_RSA PrvKey_B
4:          const concealed   Byte    SecretMessage
5:      // FORMAT CONVERSION PARAMETERS
6:          const exposed     PARAM_Cert_PubKey                    // PARAM1
7:          const verified    PARAM_PubKey                         // PARAM2
8:          const verified    PARAM_Input_From_A       // PARAM3
9:          const concealed   PARAM_ComKey_Cert                    // PARAM4
10:         const confidential  PARAM_ComKey           // PARAM5
11:         const verified    PARAM_EncryptedMsgSize   // PARAM6
12:
13:     // VARIABLE DECLARATION
14:         exposed    int     size
15:         exposed    Byte    buf [4096]
16:         verified   Byte    OutMsg[4096]
17:         verified   Byte    EncTxt[4096]
18:         exposed    PubCert_RSA Cand_Input
19:         verified   PubCert_RSA Cert_Accept_A
20:         verified   PubKey_RSA PubKey_A
21:         exposed    PubKeyl_RSA Input_From_A
22:         concealed  PubKeyO_RSA From_A
23:         concealed  PubCert_RSA Cand_Cert_ComKey
24:         confidential PubCert_RSA Cert_ComKey_Kc
25:         confidential ComKey_AESB ComKey_Kc
26:
27:     // PROCESS FLOW
28:
29:         Input (buf, size)
30:         Cand_Input = Extract (PARAM_Cert_PubKey, buf )
31:
32:         if PublicVerifyRSA (Cand_Input, PubKey_CA, Cert_Accept_A) then
33:            PubKey_A = Extract_verified (PARAM_PubKey, Cert_Accept_A)
34:         else
35:            exit;
36:
37:         Input (buf, size)
38:         Input_From_A = Extract (PARAM_Input_From_A, buf)
39:
40:         PublicDecryptRSA (Input_From_A, PrvKey_B, From_A)
41:         Cand_Cert_ComKey = Extract_concealed (PARAM_ComKey_Cert, From_A)
42:
43:         if PublicVerifyRSA (Cand_Cert_ComKey, PubKey_A, Cert_ComKey_Kc) then
44:             ComKey_Kc = Extract_confidential (PARAM_ComKey, Cert_ComKey_Kc)
45:         else
46:            exit;
47:
48:         CommonEcnryptAES (SecretMessage, ComKey_Kc, EncTxt)
49:
50:         OutMsg = Concat (PARAM_EncryptedMsgSize, EncTxt)
51:
52:         Output (OutMsg, PARAM_EncryptedMsgSize)
```

FIG. 13

| LARGE CLASSIFICATIONS | MIDDLE CLASSIFICATIONS | SUPPLEMENTARY CLASSIFICATIONS | SECURITY FUNCTION NAME | INPUT TYPE | INPUT PROTECTION ATTRIBUTE | KEY VALUE (SPECIAL INPUT) TYPE | KEY VALUE (SPECIAL INPUT) PROTECTION ATTRIBUTE | OUTPUT TYPE | OUTPUT PROTECTION ATTRIBUTE | SUPPLEMENTARY OUTPUT |
|---|---|---|---|---|---|---|---|---|---|---|
| PUBLIC KEY ENCRYPTIONS | PUBLIC KEY DECRYPTION | PUBLIC KEY DECRYPTION A | PublicDecryptRSA | CRYPTO-GRAM | VERIFIED | PRIVATE KEY | CONFIDENTIAL | PLAIN TEXT | CONFIDENTIAL | |
| | | PUBLIC KEY DECRYPTION B | PublicDecryptRSA | CRYPTO-GRAM | EXPOSED | PRIVATE KEY | CONFIDENTIAL | PLAIN TEXT | CONCEALED | |
| PUBLIC KEY SIGNATURES | PUBLIC KEY SIGNATURES VERIFICATION | PUBLIC KEY SIGNATURES VERIFICATION A | PublicVerifyRSA | SIGNATURE | CONCEALED | PUBLIC KEY | VERIFIED | OUTPUT TEXT | CONFIDENTIAL | RESULT |
| | | PUBLIC KEY SIGNATURES VERIFICATION B | PublicVerifyRSA | SIGNATURE | EXPOSED | PUBLIC KEY | VERIFIED | OUTPUT TEXT | VERIFIED | RESULT |
| COMMON KEY ENCRYPTIONS FUNCTION | COMMON KEY ENCRYPTIONS | PRIVATE KEY ENCRYPTIONS A | CommonEncryptAES | PLAIN TEXT | CONFIDENTIAL | PRIVATE KEY | CONFIDENTIAL | CRYPTO-GRAM | VERIFIED | |
| | | PRIVATE KEY ENCRYPTIONS B | CommonEncryptAES | PLAIN TEXT | CONCEALED | PRIVATE KEY | CONFIDENTIAL | CRYPTO-GRAM | EXPOSED | |

FIG.16

| DEFINI-TION | VARIABLE NAME | REMARKS | PROTECTION ATTRIBUTE | MEANING | EXPOSED | VERIFIED | CONCEALED | CONFIDENTIAL | ERROR LINE |
|---|---|---|---|---|---|---|---|---|---|
| L2 | PubKey_CA | INITIAL VALUE | VERIFIED | PUBLIC KEY FOR CA | × | ○ | × | × | L29 |
| L3 | PrvKey_B | INITIAL VALUE | CONFIDENTIAL | PRIVATE KEY FOR B | × | × | × | ○ | L37 |
| L4 | SecretMessage | INITIAL VALUE | CONFIDENTIAL | CONFIDENTIAL MESSAGE | × | × | × | ○ | L45 |
| L6 | PARAM_Cert_PubKey | PARAMETER | EXPOSED | DATA FORMAT CONVERSION | ○ | × | × | × | L27 |
| L7 | PARAM_PubKey | PARAMETER | VERIFIED | DATA FORMAT CONVERSION | × | ○ | × | × | L30 |
| L8 | PARAM_Input_From_A | PARAMETER | VERIFIED | DATA FORMAT CONVERSION | × | ○ | × | × | L35 |
| L9 | PARAM_ComKey_Cert | PARAMETER | CONFIDENTIAL | DATA FORMAT CONVERSION | × | × | × | ○ | L38 |
| L12 | size | INPUT AND OUTPUT VARIABLE | EXPOSED | INPUT AND OUTPUT SIZE | ○ | × | × | × | L24 |
| L13 | buf | INPUT AND OUTPUT VARIABLE | EXPOSED | INPUT AND OUTPUT BUFFER | ○ | × | × | × | L24 |
| L14 | EncTxt | OUTPUT VARIABLE | VERIFIED | INPUT AND OUTPUT BUFFER | ○ | × | × | × | L45 |
| L15 | Cand_Input | OPERATION VARIABLE | EXPOSED | PRE-VERIFICATION KEY CERTIFICATION A | × | ○ | × | × | L27 |
| L16 | Cert_Accept_A | OPERATION VARIABLE | VERIFIED | POST-VERIFICATION KEY CERTIFICATION A | × | ○ | × | × | L27 |
| L17 | PubKey_A | OPERATION VARIABLE | VERIFIED | PUBLIC KEY A | × | ○ | × | × | L30 |
| L18 | Input_From_A | OPERATION VARIABLE | EXPOSED | PRE-DECRYPTION INPUT | ○ | × | × | × | L35 |
| L19 | From_A | OPERATION VARIABLE | CONCEALED | DECRYPTED INPUT | × | × | ○ | × | L38 |
| L20 | Cand_Cert_ComKey | OPERATION VARIABLE | CONCEALED | POST-DECRYPTION COMMON KEY CERTIFICATION | × | × | ○ | × | L38 |
| L21 | Cert_ComKey_Kc | OPERATION VARIABLE | CONCEALED | COMMON KEY CERTIFICATION | × | × | ○ | × | L40 |
| L22 | ComKey_Kc | OPERATION VARIABLE | CONFIDENTIAL | VERIFIED COMMON KEY | × | × | × | ○ | L41 |

FIG. 19

| PARTIAL DATA FLOW NUMBER | PROTECTION ATTRIBUTE | INITIALIZATION CONSTANT, VARIABLE, AND DUMMY ARGUMENT NAME |
|---|---|---|
| 1 | EXPOSED<br>EXPOSED<br>EXPOSED<br>EXPOSED<br>EXPOSED<br>EXPOSED | #D11_Input (#1)<br>buf<br>Param1<br>Extract<br>Cand_Input<br>#D12_PublicVerifyRSA (#1) |
| 2 | VERIFIED<br>VERIFIED | KpCA<br>#D12_PublicVerifyRSA (#2) |
| 3 | VERIFIED<br>VERIFIED<br>VERIFIED<br>VERIFIED<br>VERIFIED<br>VERIFIED | #D12_PublicVerifyRSA (#3)<br>Cert_Accept_A<br>Param2<br>Extract<br>PubKey_A<br>#D15_PublicVerifyRSA (#2) |
| 4 | EXPOSED<br>EXPOSED<br>EXPOSED<br>EXPOSED<br>EXPOSED<br>EXPOSED | #D13_Input<br>buf<br>Param3<br>Extract<br>Input_From_A<br>#D14_PublicDecryptRSA (#1) |
| 5 | CONFIDENTIAL<br>CONFIDENTIAL | KsB<br>#D14_PublicDecryptRSA (#2) |
| 6 | CONCEALED<br>CONCEALED<br>CONCEALED<br>CONCEALED<br>CONCEALED<br>CONCEALED | #D14_PublicDecryptRSA (#3)<br>From_A<br>Param4<br>Extract<br>Cand_Cert_ComKey<br>#D15_PublicVerifyRSA (#1) |
| 7 | CONFIDENTIAL<br>CONFIDENTIAL<br>CONFIDENTIAL<br>CONFIDENTIAL<br>CONFIDENTIAL<br>CONFIDENTIAL | #D15_PublicVerifyRSA (#3)<br>Cert_ComKey_Kc<br>Param5<br>Extract<br>ComKey_Kc<br>#D16_CommonKeyEncryptAES (#2) |
| 8 | CONFIDENTIAL<br>CONFIDENTIAL | SecretMessage<br>#D16_CommonKeyEncryptAES (#1) |
| 9 | VERIFIED<br>VERIFIED<br>VERIFIED<br>VERIFIED<br>VERIFIED<br>VERIFIED | #D16_CommonKeyEncryptAES (#3)<br>EncTxt<br>Param6<br>Concat<br>OutMsg<br>#D17_Output (#1) |
| 10 | VERIFIED<br>VERIFIED | Param6<br>#D17_Output (#2) |

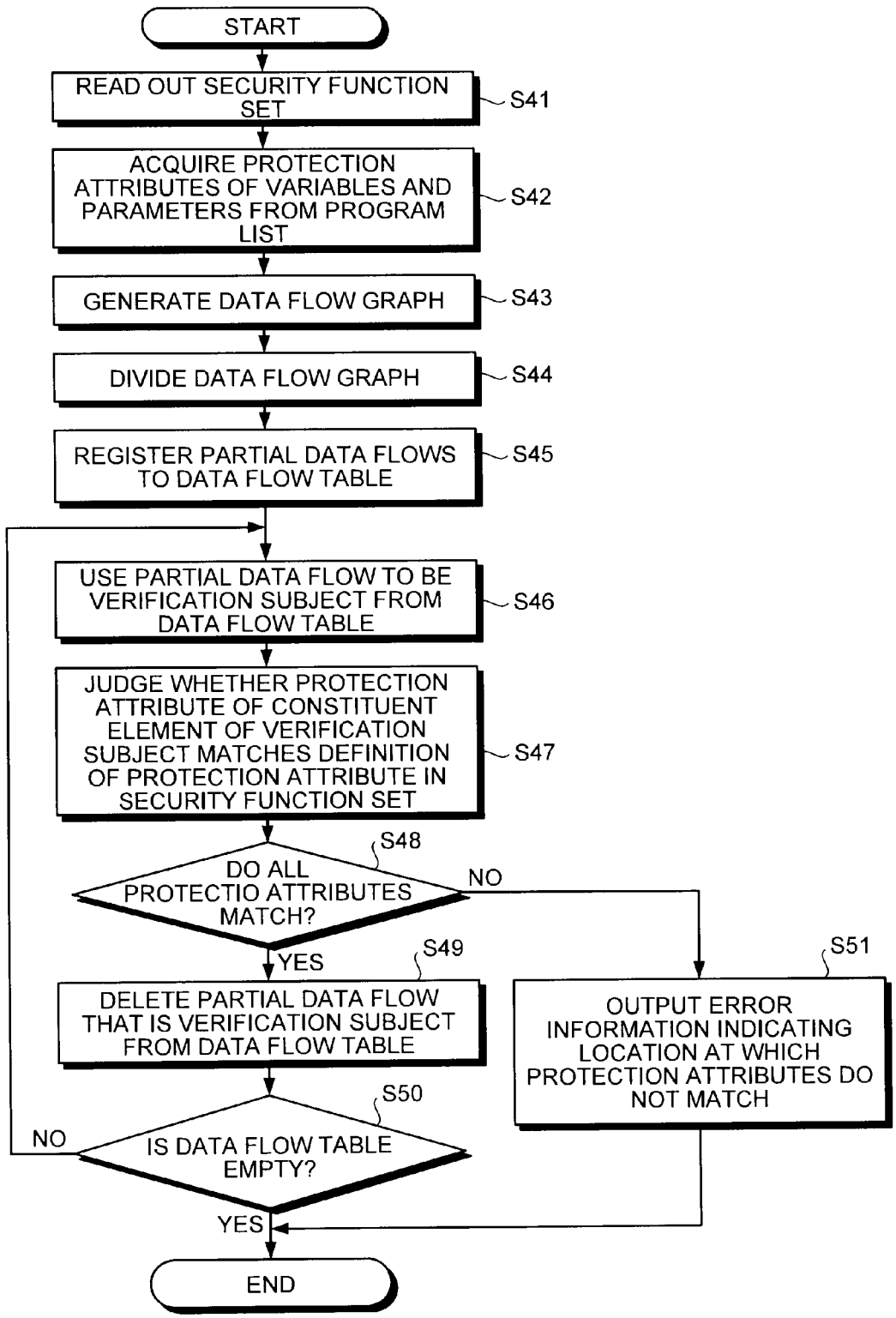

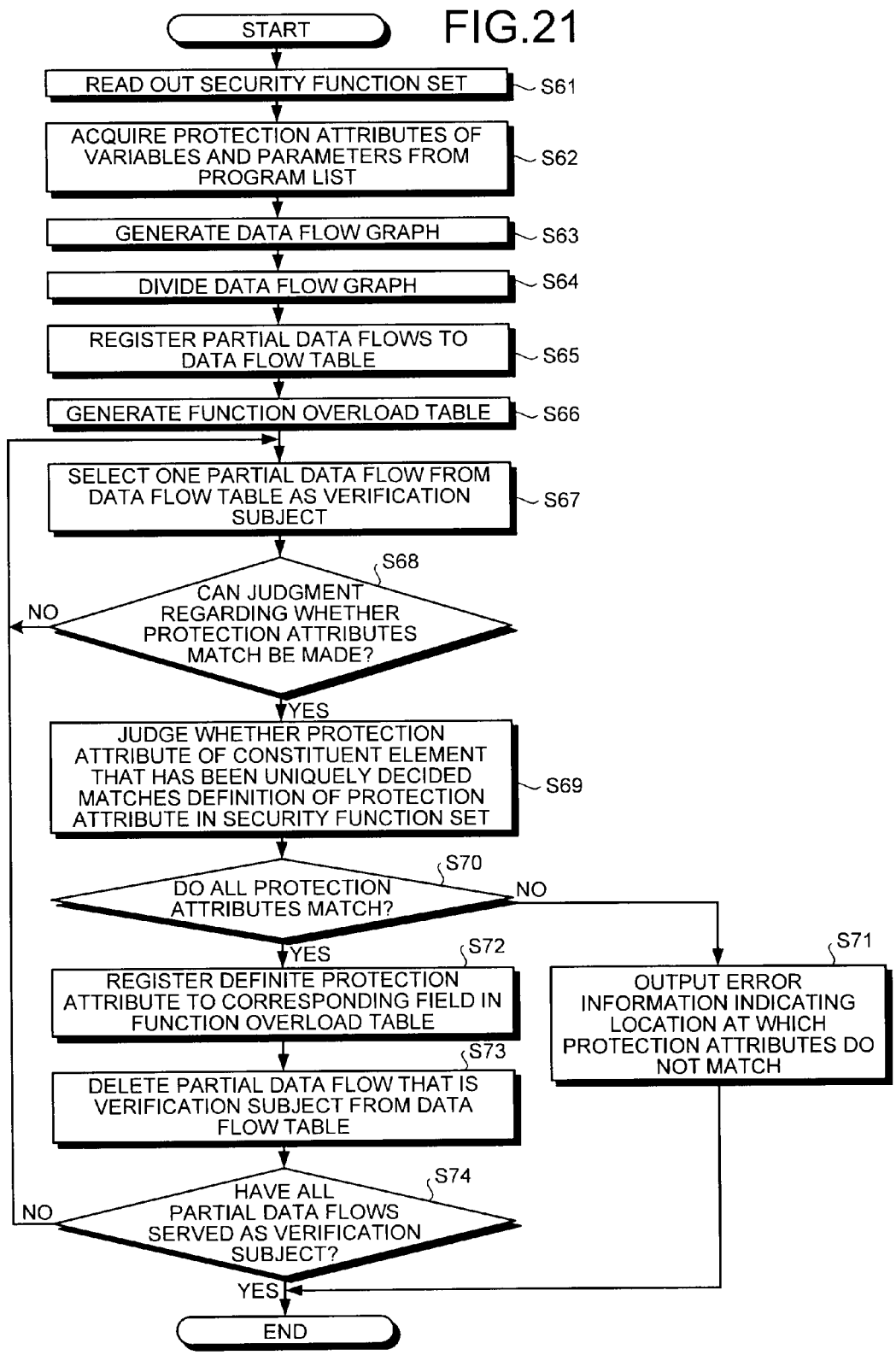

```
confidential SecretKey
exposed Omsg, size

CommonKeyEncrypt (PhysicalRandom(), SecretKey, Omsg)
Output (Omsg, size)
```

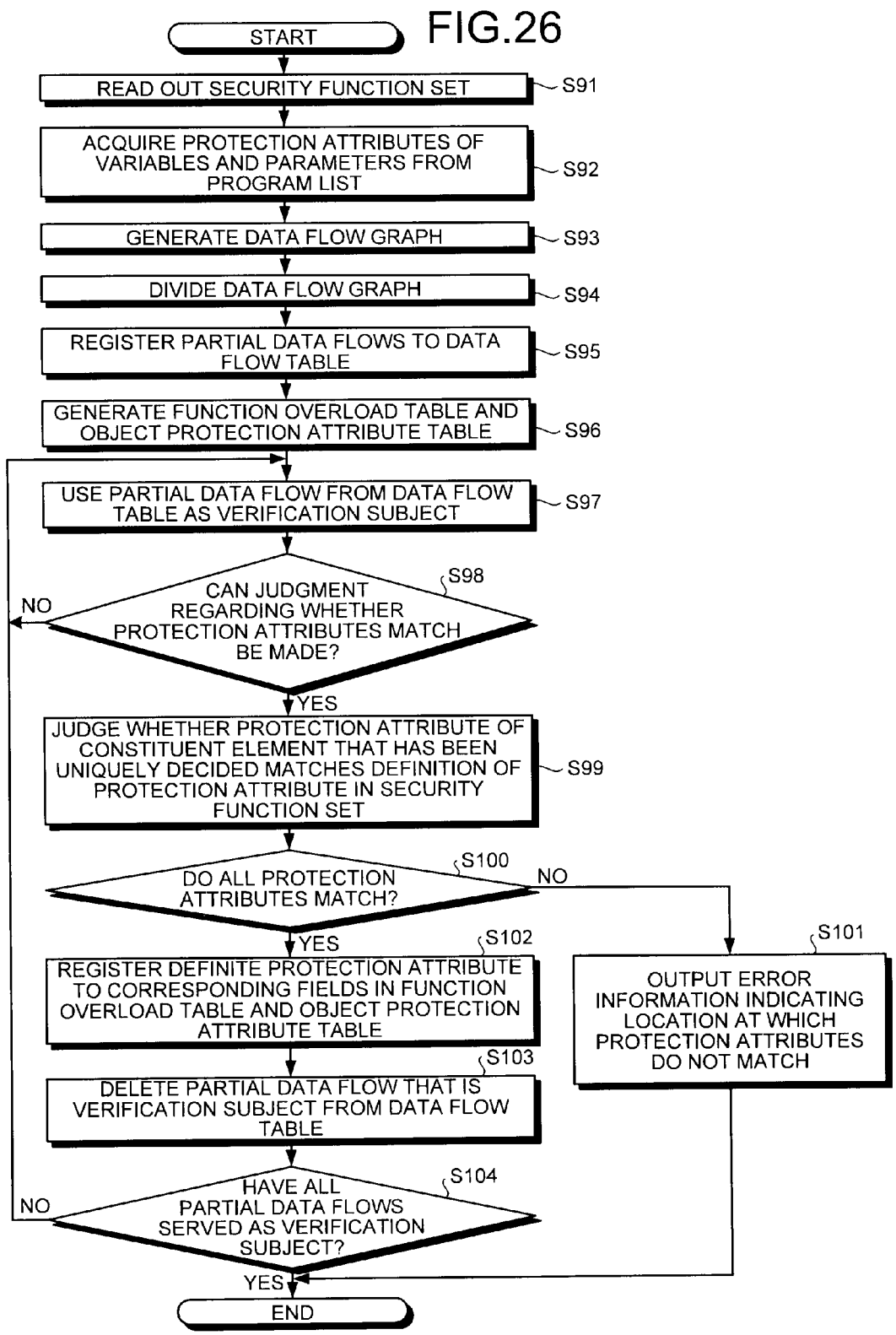

FIG.27

```
1:   // INITIAL DATA
2:   const verified    PubKey_RSA PubKey_CA
3:   const confidential PrvKey_RSA PrvKey_B
4:   const confidential Byte    SecretMessage
5:   // FORMAT CONVERSION PARAMETERS
6:   const PARAM_Cert_PubKey                    // PARAM1
7:   const PARAM_PubKey                                      // PARAM2
8:   const PARAM_Input_From_A                   // PARAM3
9:   const PARAM_ComKey_Cert                    // PARAM4
10:  const PARAM_ComKey                         // PARAM5
11:  const PARAM_EncryptedMsgSize    // PARAM6
12:
13:  // VARIABLE DECLARATION
14:  int     size
15:  Byte    buf [4096]
16:  Byte    OutMsg[4096]
17:  Byte    EncTxt[4096]
18:  PubCert_RSA Cand_Input
19:  PubCert_RSA Cert_Accept_A
20:  PubKey_RSA PubKey_A
21:  PubKeyI_RSA Input_From_A
22:  PubKeyO_RSA From_A
23:  PubCert_RSA Cand_Cert_ComKey
24:  PubCert_RSA Cert_ComKey_Kc
25:  ComKey_AESB ComKey_Kc
26:
27:  // PROCESS FLOW
28:
29:  Input (buf, size)
30:  Cand_Input = Extract (PARAM_Cert_PubKey, buf )
31:
32:  if PublicVerifyRSA (Cand_Input, PubKey_CA, Cert_Accept_A) then
33:    PubKey_A = Extract_verified (PARAM_PubKey, Cert_Accept_A)
34:  else
35:    exit;
36:
37:  Input (buf, size)
38:  Input_From_A = Extract (PARAM_Input_From_A, buf)
39:
40:  PublicDecryptRSA (Input_From_A, PrvKey_B, From_A)
41:  Cand_Cert_ComKey = Extract_concealed (PARAM_ComKey_Cert, From_A)
42:
43:  if PublicVerifyRSA (Cand_Cert_ComKey, PubKey_A, Cert_ComKey_Kc) then
44:    ComKey_Kc = Extract_confidential (PARAM_ComKey, Cert_ComKey_Kc)
45:  else
46:    exit;
47:
48:  CommonEcnryptAES (SecretMessage, ComKey_Kc, EncTxt)
49:
50:  OutMsg = Concat (PARAM_EncryptedMsgSize, EncTxt)
51:  Output (OutMsg, PARAM_EncryptedMsgSize)
```

FIG. 28A

| PARTIAL DATA FLOW NUMBER | INITIALIZATION CONSTANT, VARIABLE, AND DUMMY ARGUMENT NAME | INITIAL PROTECTION ATTRIBUTE | DECIDING SUBJECT=1 BEFORE | DECIDING SUBJECT=1 AFTER | INSPECTION SUBJECT=2 BEFORE AND AFTER |
|---|---|---|---|---|---|
| 1 | #D12_Input (#1)<br>buf<br>Param1<br>Extract<br>Cand_Input<br>#D12_PublicVerifyRSA (#1) | EXPOSED | EXPOSED<br>EXPOSED ○<br>EXPOSED ○<br>EXPOSED ○<br>EXPOSED ○<br>EXPOSED | EXPOSED<br>EXPOSED<br>EXPOSED<br>EXPOSED<br>EXPOSED<br>EXPOSED | EXPOSED<br>EXPOSED<br>EXPOSED<br>EXPOSED<br>EXPOSED<br>EXPOSED |
| 2 | KpCA<br>#D12_PublicVerifyRSA (#2) | VERIFIED<br>VERIFIED | VERIFIED<br>VERIFIED | VERIFIED<br>VERIFIED | VERIFIED ○<br>VERIFIED ○ |
| 3 | #D12_PublicVerifyRSA (#3)<br>Cert_Accept_A<br>Param2<br>Extract<br>PubKey_A<br>#D15_PublicVerifyRSA (#2) | VERIFIED/CONFIDENTIAL<br><br><br><br>VERIFIED | VERIFIED/CONFIDENTIAL<br><br><br><br>VERIFIED | VERIFIED ○<br><br><br><br>VERIFIED | VERIFIED<br><br><br><br>VERIFIED |
| 4 | #D13_Input<br>buf<br>Param3<br>Extract<br>Input_From_A<br>#D14_PublicDecryptRSA (#1) | EXPOSED<br><br><br><br><br>EXPOSED/VERIFIED | EXPOSED<br><br><br><br><br>EXPOSED/VERIFIED | EXPOSED<br>EXPOSED ○<br><br><br><br>EXPOSED/VERIFIED | EXPOSED<br>EXPOSED<br><br><br><br>EXPOSED/VERIFIED |
| 5 | KsB<br>#D14_PublicDecryptRSA (#2) | CONFIDENTIAL<br>CONFIDENTIAL | CONFIDENTIAL<br>CONFIDENTIAL | CONFIDENTIAL<br>CONFIDENTIAL | CONFIDENTIAL<br>CONFIDENTIAL |
| 6 | #D14_PublicDecryptRSA (#3)<br>From_A<br>Param4<br>Extract<br>Cand_Cert_ComKey<br>#D15_PublicVerifyRSA (#1) | CONCEALED/CONFIDENTIAL<br><br><br><br>CONCEALED/EXPOSED | CONCEALED/CONFIDENTIAL<br><br><br><br>CONCEALED/EXPOSED | CONCEALED/CONFIDENTIAL<br><br><br><br>CONCEALED/EXPOSED | CONCEALED/CONFIDENTIAL<br><br><br><br>CONCEALED/EXPOSED |
| 7 | #D15_PublicVerifyRSA (#3)<br>Cert_ComKey_Kc<br>Param5<br>Extract<br>ComKey_Kc<br>#D16_CommonKeyEncryptAES (#2) | CONFIDENTIAL/VERIFIED<br><br><br><br>CONFIDENTIAL/CONCEALED | CONFIDENTIAL/VERIFIED<br><br><br><br>CONFIDENTIAL | CONFIDENTIAL/VERIFIED<br><br><br><br>CONFIDENTIAL | CONFIDENTIAL/VERIFIED<br><br><br><br>CONFIDENTIAL |
| 8 | SecretMessage<br>#D16_CommonKeyEncryptAES (#1) | CONFIDENTIAL<br>CONFIDENTIAL | CONFIDENTIAL<br>CONFIDENTIAL | CONFIDENTIAL<br>CONFIDENTIAL/CONCEALED | CONFIDENTIAL<br>CONFIDENTIAL/CONCEALED |
| 9 | #D16_CommonKeyEncryptAES (#3)<br>EncTxt<br>Param6<br>Concat<br>OutMsg<br>#D17_Output (#1) | VERIFIED/EXPOSED<br><br><br><br>EXPOSED/VERIFIED | VERIFIED/EXPOSED<br><br><br><br>EXPOSED/VERIFIED | VERIFIED/EXPOSED<br><br><br><br>EXPOSED/VERIFIED | VERIFIED/EXPOSED<br><br><br><br>EXPOSED/VERIFIED |
| 10 | Param6<br>#D17_Output (#2) | EXPOSED/VERIFIED | EXPOSED/VERIFIED | EXPOSED/VERIFIED | EXPOSED/VERIFIED |

FIG.28B

| INSPECTION SUBJECT=3 BEFORE AND AFTER | INSPECTION SUBJECT=4 BEFORE | INSPECTION SUBJECT=4 AFTER | INSPECTION SUBJECT=5 BEFORE AND AFTER | INSPECTION SUBJECT=6 BEFORE | INSPECTION SUBJECT=6 AFTER |
|---|---|---|---|---|---|
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| VERIFIED | VERIFIED | VERIFIED | VERIFIED | VERIFIED | VERIFIED |
| VERIFIED | VERIFIED | VERIFIED | VERIFIED | VERIFIED | VERIFIED |
| VERIFIED | VERIFIED | VERIFIED | VERIFIED | VERIFIED | VERIFIED |
| VERIFIED | VERIFIED | VERIFIED | VERIFIED | VERIFIED | VERIFIED |
| VERIFIED | VERIFIED | VERIFIED | VERIFIED | VERIFIED | VERIFIED |
| VERIFIED ○ | VERIFIED | VERIFIED | VERIFIED | VERIFIED | VERIFIED |
| VERIFIED ○ | VERIFIED | VERIFIED | VERIFIED | VERIFIED | VERIFIED |
| VERIFIED ○ | VERIFIED | VERIFIED | VERIFIED | VERIFIED | VERIFIED |
| VERIFIED | VERIFIED | VERIFIED | VERIFIED | VERIFIED | VERIFIED |
| EXPOSED | EXPOSED | EXPOSED | EXPOSED | EXPOSED | EXPOSED |
| EXPOSED | EXPOSED ○ | EXPOSED | EXPOSED | EXPOSED | EXPOSED |
| | EXPOSED ○ | EXPOSED | EXPOSED | EXPOSED | EXPOSED |
| | EXPOSED ○ | EXPOSED | EXPOSED | EXPOSED | EXPOSED |
| | EXPOSED ○ | EXPOSED | EXPOSED | EXPOSED | EXPOSED |
| EXPOSED/VERIFIED | EXPOSED ○ | EXPOSED | EXPOSED | EXPOSED | EXPOSED |
| CONFIDENTIAL | CONFIDENTIAL | CONFIDENTIAL | CONFIDENTIAL ○ | CONFIDENTIAL | CONFIDENTIAL |
| CONFIDENTIAL | CONFIDENTIAL | CONFIDENTIAL | CONFIDENTIAL ○ | CONFIDENTIAL | CONFIDENTIAL |
| CONCEALED/CONFIDENTIAL | CONCEALED/CONFIDENTIAL | CONCEALED | CONCEALED | CONCEALED | CONCEALED |
| | | | | CONCEALED | CONCEALED |
| | | | | CONCEALED | CONCEALED |
| | | | | CONCEALED | CONCEALED |
| | | | | CONCEALED | CONCEALED |
| CONCEALED/EXPOSED | CONCEALED/EXPOSED | CONCEALED/EXPOSED | CONCEALED/EXPOSED | CONCEALED | CONCEALED |
| CONFIDENTIAL/VERIFIED | CONFIDENTIAL/VERIFIED | CONFIDENTIAL/VERIFIED | CONFIDENTIAL/VERIFIED | CONFIDENTIAL/VERIFIED | CONFIDENTIAL ○ |
| CONFIDENTIAL | CONFIDENTIAL | CONFIDENTIAL | CONFIDENTIAL | CONFIDENTIAL | CONFIDENTIAL |
| CONFIDENTIAL | CONFIDENTIAL | CONFIDENTIAL | CONFIDENTIAL | CONFIDENTIAL | CONFIDENTIAL |
| CONFIDENTIAL/CONCEALED | CONFIDENTIAL/CONCEALED | CONFIDENTIAL/CONCEALED | CONFIDENTIAL/CONCEALED | CONFIDENTIAL/CONCEALED | CONFIDENTIAL/CONCEALED |
| VERIFIED/EXPOSED | VERIFIED/EXPOSED | VERIFIED/EXPOSED | VERIFIED/EXPOSED | VERIFIED/EXPOSED | VERIFIED/EXPOSED |
| EXPOSED/VERIFIED | EXPOSED/VERIFIED | EXPOSED/VERIFIED | EXPOSED/VERIFIED | EXPOSED/VERIFIED | EXPOSED/VERIFIED |
| EXPOSED/VERIFIED | EXPOSED/VERIFIED | EXPOSED/VERIFIED | EXPOSED/VERIFIED | EXPOSED/VERIFIED | EXPOSED/VERIFIED |

FIG. 28C

| INSPECTION SUBJECT=7 BEFORE | INSPECTION SUBJECT=7 AFTER | INSPECTION SUBJECT=8 BEFORE | INSPECTION SUBJECT=8 AFTER | INSPECTION SUBJECT=9 BEFORE | INSPECTION SUBJECT=10 |
|---|---|---|---|---|---|
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| VERIFIED | VERIFIED | VERIFIED | VERIFIED | VERIFIED | VERIFIED |
| VERIFIED | VERIFIED | VERIFIED | VERIFIED | VERIFIED | VERIFIED |
| VERIFIED | VERIFIED | VERIFIED | VERIFIED | VERIFIED | VERIFIED |
| VERIFIED | VERIFIED | VERIFIED | VERIFIED | VERIFIED | VERIFIED |
| VERIFIED | VERIFIED | VERIFIED | VERIFIED | VERIFIED | VERIFIED |
| VERIFIED | VERIFIED | VERIFIED | VERIFIED | VERIFIED | VERIFIED |
| VERIFIED | VERIFIED | VERIFIED | VERIFIED | VERIFIED | VERIFIED |
| VERIFIED | VERIFIED | VERIFIED | VERIFIED | VERIFIED | VERIFIED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| EXPOSED | EXPOSED | EXPOSED | EXPOSED | EXPOSED | EXPOSED |
| CONFIDENTIAL | CONFIDENTIAL | CONFIDENTIAL | CONFIDENTIAL | CONFIDENTIAL | CONFIDENTIAL |
| CONFIDENTIAL | CONFIDENTIAL | CONFIDENTIAL | CONFIDENTIAL | CONFIDENTIAL | CONFIDENTIAL |
| CONCEALED | CONCEALED | CONCEALED | CONCEALED | CONCEALED | CONCEALED |
| CONCEALED | CONCEALED | CONCEALED | CONCEALED | CONCEALED | CONCEALED |
| CONCEALED | CONCEALED | CONCEALED | CONCEALED | CONCEALED | CONCEALED |
| CONCEALED | CONCEALED | CONCEALED | CONCEALED | CONCEALED | CONCEALED |
| CONCEALED | CONCEALED | CONCEALED | CONCEALED | CONCEALED | CONCEALED |
| CONCEALED | CONCEALED | CONCEALED | CONCEALED | CONCEALED | CONCEALED |
| CONFIDENTIAL ○○○ | CONFIDENTIAL | CONFIDENTIAL | CONFIDENTIAL | CONFIDENTIAL | CONFIDENTIAL |
| CONFIDENTIAL ○○○ | CONFIDENTIAL | CONFIDENTIAL | CONFIDENTIAL | CONFIDENTIAL | CONFIDENTIAL |
| CONFIDENTIAL ○ | CONFIDENTIAL | CONFIDENTIAL | CONFIDENTIAL | CONFIDENTIAL | CONFIDENTIAL |
| CONFIDENTIAL | CONFIDENTIAL | CONFIDENTIAL | CONFIDENTIAL | CONFIDENTIAL | CONFIDENTIAL |
| CONFIDENTIAL | CONFIDENTIAL | CONFIDENTIAL | CONFIDENTIAL | CONFIDENTIAL | CONFIDENTIAL |
| CONFIDENTIAL | CONFIDENTIAL | CONFIDENTIAL | CONFIDENTIAL | CONFIDENTIAL | CONFIDENTIAL |
| CONFIDENTIAL/CONCEALED | CONFIDENTIAL/CONCEALED | CONFIDENTIAL ○ | CONFIDENTIAL | CONFIDENTIAL | CONFIDENTIAL |
| VERIFIED/EXPOSED | VERIFIED/EXPOSED | VERIFIED/EXPOSED | VERIFIED ○ | VERIFIED | VERIFIED |
|  |  |  |  | VERIFIED ○○○ | VERIFIED |
|  |  |  |  | VERIFIED ○○○ | VERIFIED |
|  |  |  |  | VERIFIED ○ | VERIFIED |
| EXPOSED/VERIFIED | EXPOSED/VERIFIED | EXPOSED/VERIFIED | EXPOSED/VERIFIED | VERIFIED ○ | VERIFIED |
|  |  |  |  | VERIFIED | VERIFIED |
| EXPOSED/VERIFIED | EXPOSED/VERIFIED | EXPOSED/VERIFIED | EXPOSED/VERIFIED | EXPOSED/VERIFIED | VERIFIED ○ |

INFORMATION PROCESSING DEVICE, PROGRAM VERIFICATION METHOD, AND RECORDING MEDIUM

CROSS-REFERENCE TO RELATED APPLICATIONS

This application is based upon and claims the benefit of priority from the prior Japanese Patent Application No. 2007-303765, filed on Nov. 22, 2007; the entire contents of which are incorporated herein by reference.

BACKGROUND OF THE INVENTION

1. Field of the Invention

The present invention relates to a technology for developing a computer-executable program and verifying a program list.

2. Description of the Related Art

In recent years, awareness of computer security has been rising with the popularization of information devices such as a personal computer (PC). For example, when data that should be protected is present within a computer, the data can be prevented from being needlessly read through division of areas accessible by a user based on privileged mode and ordinary mode of an operating system (OS). A technology is disclosed in JP-A 2004-240536 (KOKAI) that provides an ordinary, writable memory space and a secure memory space (protected memory area) from which reading is prohibited. Data and instructions stored in the protected memory area are prevented from being read out to an external destination. As a method of actualizing the protected memory area, a technology that combines an encryption feature and in-chip memory access control is disclosed in Hashimoto, et al., "Multi-vendor Secure Processor under a Hostile Operating System", Transactions of Information Processing Society of Japan, Vol. 45, No. SIG03. When protection is actualized in this way through a combination of the encryption feature and the access control, one of protection of confidentiality to protect secrets and protection of integrity to prevent alterations, or both can conceptually be provided.

Askarov, et al., "Cryptographically-masked Flows", 2006 discloses a technology that, when pieces of data and program portions having different security levels are present within a program referred to as Information Flow Analysis, prevents pieces of information in pieces of data having a high security level from leaking to a low security level section. The technology also achieves compatibility in data exchange between the program portions having different security levels by using type-verification when a piece of data is moved between different security levels. Moreover, when the security level of a piece of data with a high security level is dropped to a low security level, a programmer is explicitly forced to perform a specific operation, or an encryption operation is performed.

However, in the above-described conventional technologies, although a protected memory area actualizing one of the protection of confidentiality and the protection of integrity or both can be provided as hardware, when, for example, an erroneous processing content is written in a program itself used to perform data processing, a piece of data that should be protected may not be stored in the protected memory area. In this case, the piece of data may be exposed to attacks, such as leakage and alterations.

SUMMARY OF THE INVENTION

According to one aspect of the present invention, there is provided a device for processing information. The device includes a first storage unit that stores therein a plurality of types of security functions each defining a first protection attribute requiring a value of an argument related to input and output of data to be protected to be stored in a protected memory area or an unprotected memory area for each argument; a second storage unit that stores therein a program list in which a second protection attribute of a variable indicating a storage area of the data and an executing procedure of a predetermined process using any one or all of the security functions are described; an identifying unit that identifies a third protection attribute of an actual argument related to input and output of a security function described in the program list based on the second protection attribute; a first judging unit that judges whether all of third protection attributes match with corresponding first protection attributes stored in the first storage unit; and an output unit that outputs, when the first judging unit judges that not all of the third protection attributes match with the corresponding first protection attributes, error information indicating a mismatch of the protection attributes.

Furthermore, according to another aspect of the present invention, there is provided a method of verifying a program. The method includes identifying a protection attribute of an actual argument related to input and output of a security function described in a program list based on a protection attribute of a variable described in the program list describing an executing procedure of a predetermined process using any one or all of security functions from among a plurality of types of security functions each defining a protection attribute requiring a value of an argument related to input and output of data to be protected to be stored in a protected memory area or an unprotected memory area for each argument; and error information outputting including judging whether all protection attributes of actual arguments related to input and output of the security functions described in the program list match with the protection attribute of the type of security function corresponding to the security function, and outputting, when it is judged that not all of the third protection attributes match with the corresponding protection attribute, error information indicating a mismatch of the protection attributes.

Moreover, according to still another aspect of the present invention, there is provided a computer-readable recording medium that stores therein a computer program for verifying a program. The computer program causes a computer to execute identifying a protection attribute of an actual argument related to input and output of a security function described in a program list based on a protection attribute of a variable described in the program list describing an executing procedure of a predetermined process using any one or all of security functions from among a plurality of types of security functions each defining a protection attribute requiring a value of an argument related to input and output of data to be protected to be stored in a protected memory area or an unprotected memory area for each argument; and error information outputting including judging whether all protection attributes of actual arguments related to input and output of the security functions described in the program list match with the protection attribute of the type of security function corresponding to the security function, and outputting, when it is judged that not all of the third protection attributes match with the corresponding protection attribute, error information indicating a mismatch of the protection attributes.

BRIEF DESCRIPTION OF THE DRAWINGS

FIG. 6 is a diagram of a list of protection attributes;

FIG. 7 is a diagram of a list of allowable inter-assignments between protection attributes;

FIG. 8 is a diagram of an example of definitions of security functions;

FIG. 9 is a diagram of a configuration of a signature verification function;

FIG. 10A is a diagram of an example of definitions of non-security functions;

FIG. 10B is a diagram of another example of the definitions of the non-security functions;

FIG. 11 is a diagram of an example of a program list;

FIG. 13 is a diagram of an example of definitions of security functions according to the first embodiment;

FIG. 16 is a diagram of protection attributes of variables and error detection results according to the first embodiment;

FIG. 19 is a diagram of an example of a partial data flow;

FIG. 20 is a flowchart of an overview of a protection attribute verifying process according to the second embodiment;

FIG. 21 is a flowchart of details of the protection attribute verifying process according to the second embodiment;

FIG. 26 is a flowchart of a protection attribute deciding process according to the fourth embodiment;

FIG. 27 is a diagram of an example of a program list;

FIG. 28A is a diagram of results of the protection attribute deciding process;

FIG. 28B is a diagram of the results of the protection attribute deciding process; and FIG. 28C is a diagram of the results of the protection attribute deciding process.

DETAILED DESCRIPTION OF THE INVENTION

Exemplary embodiments of the present invention are explained in detail below with reference to the accompanying drawings. An example in which an information processing device, a method, and a computer program product of the present invention are applied to a program developing device 300 that develops a program executable by a computer is hereinafter described. However, the present invention is not limited thereto.

Figure 1:
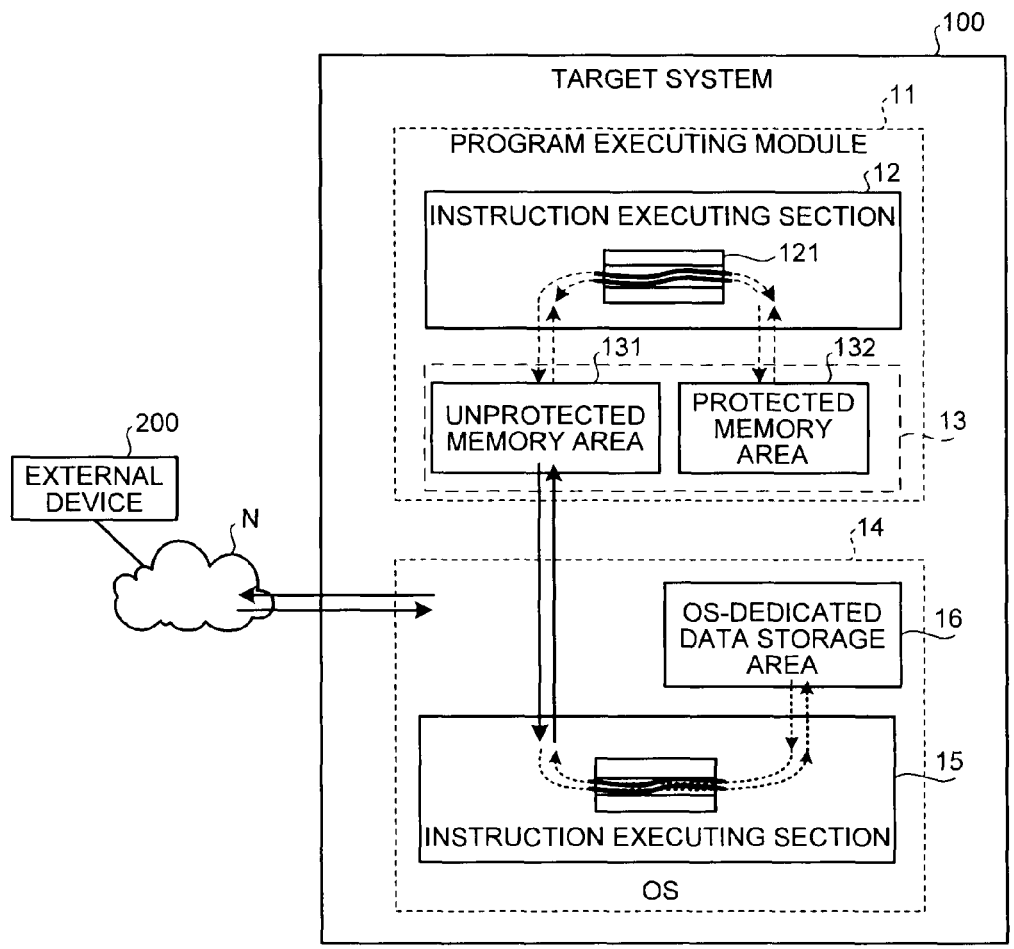
FIG. 1 is a diagram of a software configuration of a target system.

First, specifications of a target system 100 through which a program developed by the program developing device 300 is executed will be described with reference to FIG. 1. FIG. 1 is a block diagram of a software configuration of the target system 100. The target system 100 includes a program executing module 11 to be protected and an OS 14. The program executing module 11 serves as a program executing body. The OS 14 manages input and output operations performed between the target system 100 and external devices. The target system 100 can execute an application program (not shown), in addition to the program executing module 11 to be protected.

The program executing module 11 includes an instruction executing section 12 and a data storage memory area 13. Here, the instruction executing section 12 is a controlling section, such as a central processing unit (CPU), serving as a program executing body. The instruction executing section 12 includes a register 121 in which data is temporarily stored during a program execution. The instruction executing section 12 inputs and outputs data by writing data to and reading data from the data storage memory area 13. The program executing module 11 performs processing by the instruction executing section 12 reading an instruction from the data storage memory area 13. As a result of the instruction executing section 12 executing the instruction, data is read from the data storage memory area 13 to the register 121 and, conversely, data is written from the register 121 to the data storage memory area 13. The instruction executing section 12 is essentially a controlling section, such as a CPU serving as a program executing body, as described hereafter with reference to FIG. 2 and FIG. 3.

The data storage memory area 13 includes an unprotected memory area 131 and a protected memory area 132. The unprotected memory area 131 is an insecure storage area allowing unrestricted access. On the other hand, the protected memory area 132 is a secure storage area to which access from specific programs, processes, and the like is restricted. The unprotected memory area 131 and the protected memory area 132 can be formed within a same storage medium. Alternatively, the unprotected memory area 131 and the protected memory area 132 can be formed by separate storage media. A known technology can be used to actualize exclusive access control regarding specific programs and processes, such as that described above. Instructions in the program executing module 11 are read into the protected memory area 132 in advance, independent of the OS 14 and other programs. An example of data being securely read into the protected memory area 132 of the program executing module 11, such as that described above, is disclosed in the above-mentioned "*Multi-vendor Secure Processor under a Hostile Operating System*".

The OS 14 includes an instruction executing section 15 and an OS-dedicated data storage area 16. The instruction executing section 15 is a controlling section, such as a CPU, serving as a basic software executing body of the target system 100. The instruction executing section 15 includes a register 151 in which data is temporarily stored during a basic software execution. The OS-dedicated data storage area 16 is a storage area dedicated to the instruction executing section 15. The OS 14 can also access the unprotected memory area 131 of the program executing module 11. In a manner similar to that of the program executing module 11, the OS 14 performs processing by the instruction executing section 15 reading an instruction from the OS-dedicated data storage area 16. As a result of the instruction executing section 15 executing the instruction, data is read from the OS-dedicated data storage area 16 or the unprotected memory area 131 to the register 121 and, conversely, data is written from the register 121 to the data storage memory area 13 or the unprotected memory area 131.

When communication with an external device is performed, the OS 14 accesses the data storage memory area 13, and writes input data (such as data input from an external device 200 via a network N) and reads output data (such as data output to the external device 200 via the network N). Here, within the data storage memory area 13, the OS 14 can write data to and read data from the unprotected memory area 131 at an arbitrary timing. However, the above-mentioned access control prohibits the OS 14 from writing data to and reading data from the protected memory area 132. Access to the data storage memory area 13 (unprotected memory area 131) is not limited to that by the OS 14. Access, such as direct memory access (DMA) transfer by a peripheral device under control of the OS 14, is also included.

The instruction executing section 12 of the program executing module 11 and the instruction executing section 15 of the OS 14 can be a same controlling section. Alternatively, the instruction executing section 12 and the instruction executing section 15 can be separate controlling sections specific to respective purposes. The unprotected memory area 131, the protected memory area 132, and the OS-dedicated data storage area 16 can be provided within a same storage device. Alternatively, the unprotected memory area 131, the protected memory area 132, and the OS-dedicated data storage area 16 can be provided in separate storage devices. Examples of a hardware configuration of the target system 100 will be described with reference to FIGS. 2 and 3.

Figure 2:
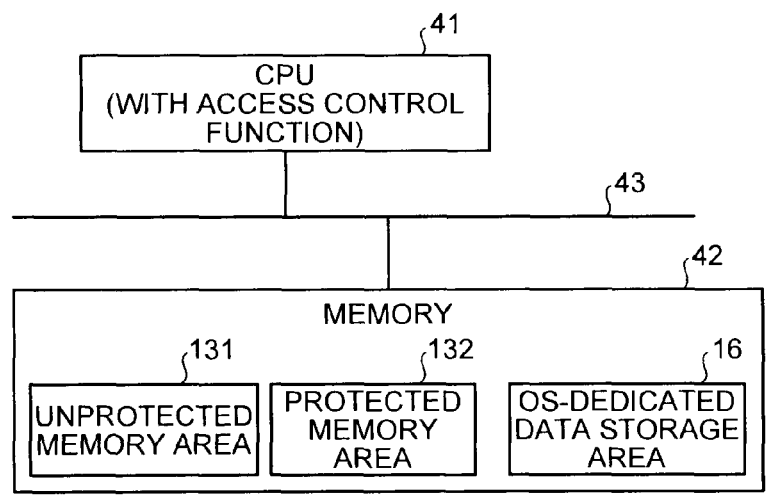
FIG. 2 is a block diagram of an example of a hardware configuration of the target system.

FIG. 2 is a schematic block diagram of an example of the hardware configuration of the target system 100. In the configuration, the target system 100 includes a single CPU 41 and a single memory 42 that is a storage device. A bus 43 connects the CPU 41 and the memory 42. Here, the CPU 41 is a controlling section that functions as the instruction executing sections 12 and 15. The CPU 41 provides an access control function for controlling access to the protected memory area 132. In the memory 42, storage areas respectively corresponding to the unprotected memory area 131, the protected memory area 132, and the OS-dedicated data storage area 16 are reserved in advance. In the configuration, the access control function provided by the CPU 41 manages writing of data to and reading of data from the protected memory area 132. As a result, the specifications of the target system 100 shown in FIG. 1 are actualized.

Figure 3:
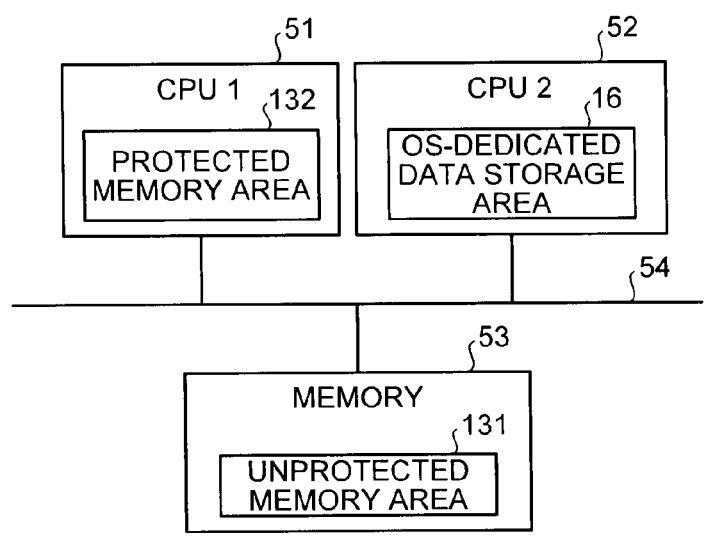
FIG. 3 is a block diagram of another example of a hardware configuration of the target system.

FIG. 3 is a schematic block diagram of another example of the hardware configuration of the target system 100. In the configuration, the target system 100 includes two CPU, a CPU 51 (CPU 1) and a CPU 52 (CPU 2), and a single memory 53 that is a storage device. A bus 54 connects the CPU 51, the CPU 52, and the memory 53. Here, the CPU 51 is a controlling section that functions as the instruction executing section 12. The protected memory area 132 is reserved within an internal memory of the CPU 51. The CPU 52 is a controlling section that functions as the instruction executing section 15 or, in other words, executes basic software. The OS-dedicated data storage area 16 is reserved within an internal memory of the CPU 52. The unprotected memory area 131 is reserved within the memory 53. In the configuration, the access control function provided by the CPU 51 manages writing of data to and reading of data from the protected memory area 132. As a result, the specifications of the target system 100 shown in FIG. 1 are actualized.

In the above-described specifications in FIG. 1, data stored in the unprotected memory area 131 may be stolen, altered, and the like (collectively referred to, hereinafter, as "attack") by operation of another application program (not shown) or the OS 14. Therefore, according to the embodiments, the program developing device 300 is described that can prevent data that should be protected from being unintentionally stored in the unprotected memory area 131 as a result of the program executing module 11 performing a verification during program creation to check that the data is not stored in the unprotected memory area 131. The program developing device 300 is described below. Two types of attacks may occur. A user of the external device 200 may execute malicious program as an application or a portion of the OS 14 running on the target system 100, through a network. Alternatively, an owner of the target system 100 himself may similarly execute a malicious program. In the latter instance, the owner of the target system 100 himself performs an unauthorized operation on the program executing module 11 intended to provide protection for digital contents and financial transactions performed by the target system 100. The present invention is advantageous for both types of attacks.

Figure 4:
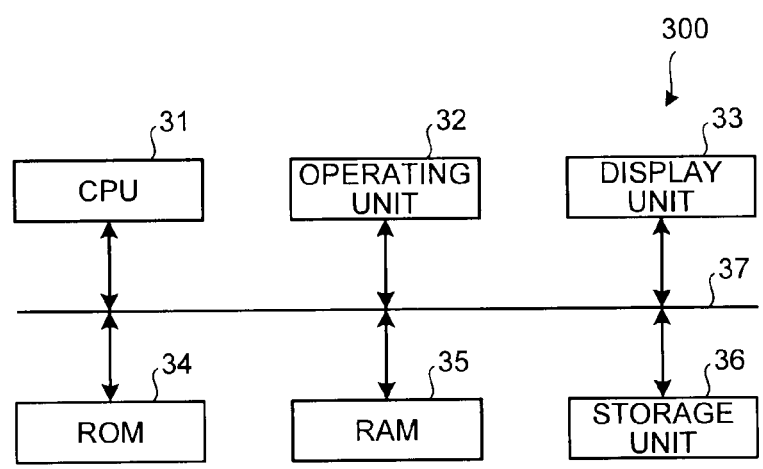
FIG. 4 is a block diagram of a hardware configuration of a program developing device.

FIG. 4 is a block diagram of a hardware configuration of the program developing device 300. Here, the program developing device 300 develops a program (executable-format program) that is executed by the target system 100. The program developing device 300 is an information processing device, such as a PC.

The program developing device 300 includes a CPU 31, an operating unit 32, a display unit 33, a read-only memory (ROM) 34, a random access memory (RAM) 35, and a storage unit 36. A bus 37 connects the CPU 31, the operating unit 32, the display unit 33, the ROM 34, the RAM 35, and the storage unit 36.

The CPU 31 uses a predetermined area of the RAM 35 as a working area. The CPU 31 performs various processes in cooperation with various control programs stored in the ROM 34 or the storage unit 36 in advance. The CPU 31 performs an overall control of operations performed by each component forming the program developing device 300.

The CPU 31 actualizes functions of each functional unit described hereafter in cooperation with a predetermined program stored in the ROM 34 or the storage unit 36 in advance. Operations performed by each functional unit will be described hereafter.

The operating unit 32 includes an inputting device, such as a keyboard and a mouse. The operating unit 32 receives information entered by a user as an instruction signal and outputs the instruction signal to the CPU 31.

The display unit 33 is formed by a display device, such as a liquid crystal display (LCD). The display unit 33 displays various pieces of information based on a display signal from the CPU 31. The display unit 33 can be integrated with the operating unit 32 to form a touch panel.

The ROM 34 stores therein programs, various pieces of setting information, and the like related to control of the program developing device 300. The programs, the pieces of setting information, and the like cannot be rewritten.

The RAM 35 is a main storage device of the program developing device 300. The RAM 35 functions as a working area of the CPU 31, and serves as a buffer and the like.

The storage unit 36 includes a storage medium that is magnetically or optically recordable. The storage unit 36 stores therein programs, various pieces of setting information, and the like related to control of the program developing device 300. The programs, the pieces of setting information, and the like can be rewritten. The storage unit 36 also stores therein assignment conversion rules (see FIG. 7), a security function list (see FIG. 8), a non-security function list (see FIGS. 10A and 10B), and the like.

Next, various pieces of information stored in the storage unit 36 will be described while describing an implementation environment for the program developed by the program developing device 300. First, security process notations used to describe the implementation environment hereafter will be described. E_Kx[Content] indicates a cryptogram obtained as a result of a Content being encrypted by a key Kx. Encryption is classified into a public key system and a common key system, determined based on a type of the key Kx. cert[Text] indicates a signature generated for a Text to be signed. A symbol || indicates a bit concatenation.

Figure 5:
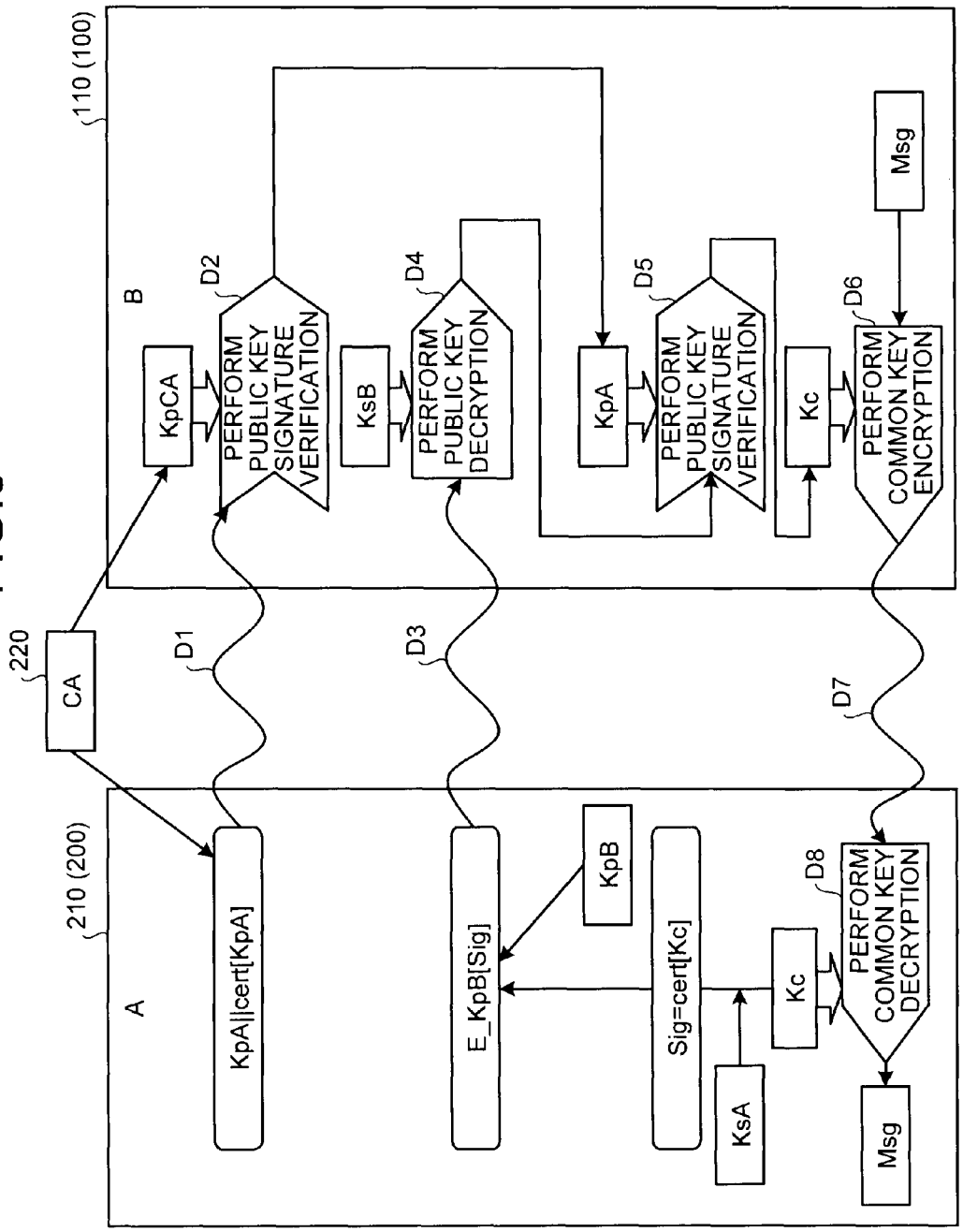
FIG. 5 is a diagram of an example of a security protocol.

FIG. 5 is a diagram of an example of a specific implementation environment for the program developed by the program developing device 300. As an example of the implementation environment, an aspect is shown in which a message transfer is performed between a program executing module 110 and a system 210 by a security protocol using hybrid encryption. In actuality, the program developing device 300 generates a program (executable-format program) executed by the program executing module 110. As a result of content of an application program 21 generated by the program developing device 300 being changed, various security systems in addition to the above-described security protocol can be securely implemented in hardware environments shown in FIG. 2 and FIG. 3.

In FIG. 5, the program executing module 110 that transfers messages corresponds to the program executing module 11 in the target system 100 in FIG. 1. The system 210 corresponds to the external device 200. A certificate authority (CA) 220 issues a public key (KpCA) and a key certificate required for certification performed between the program executing module 110 and the system 210.

The CA 220 distributes the public key KpCA to the program executing module 110 and the system 210 in advance. Validity (integrity) of the public key KpCA is guaranteed in advance. The CA 220 issues a public key certification KpA||cert[KpA] for a public key KpA of the system 210 in advance using a private key of the CA 220 itself, and distributes the public key certification KpA||cert[KpA] to the system 210 in advance. The public key certification KpA||cert[KpA] includes the public key KpA of the system 210.

The program executing module 110 holds a private key KsB of the program executing module 110 itself, a message Msg to be transferred, and the public key KpCA distributed by the CA 220. The program executing module 110 holds the KpCA by embedding a value within an instruction in the application program 21. Alternatively, the program executing module 110 holds the KpCA using the register 121 in the instruction executing section 12, a storage device (not shown), and the like. The system 210 holds a private key KsA of the system 210 itself, the public key KpA of the system 210 itself, the public key certification KpA||cert[KpA] issued by the CA 220, and the public key KpCA distributed by the CA 220 in a storage device (not shown).

Hereafter, the implementation environment shown in FIG. 5 will be described. The description focuses on operations performed by the program executing module 110 in which the program is to be implemented. Descriptions of operations performed by the system 210 are omitted accordingly.

First, when the system 210 sends the public key certification KpA||cert[KpA] of the system 210 itself to the program executing module 110 (D1), the program executing module 110 verifies the public key certification KpA||cert[KpA] using the public key KpCA of the CA 220 and checks the integrity of the public key KpA of the system 210 included in the public key certification KpA||cert[KpA] (D2).

After generating a temporary key (common key) Kc used for message transfer, the system 210 generates a signature Sig(=cert[Kc]) from the private key KsA of the system 210 itself. The system 210 encrypts the signature Sig(=cert[Kc]) with a public key KpB of the program executing module 110, generating data E_KpB[Sig]. The system 210 then sends the data E_KpB[Sig] to the program executing module 110 (D3). At this time, it is assumed that a same verifying process performed on the public key KpA is performed in advance on the public key KpB of the program executing module 110. However, an explanation thereof is omitted.

Upon receiving the data E_KpB[Sig], the program executing module 110 decrypts the data E_KpB[Sig] using a public key algorithm using the private key KsB of the program executing module 110 itself (D4). Next, the program executing module 110 performs a signature verification using the public key KpA of which the integrity has been checked by the public key signature verification performed at D2 (D5). The program executing module 110 thereby acquires a common key Kc. Here, confidentiality and integrity of the common key Kc is confirmed by signature verification using the public key KpA that has been decrypted using the private key of the program executing module 110 itself and of which validity has been checked. Therefore, the common key Kc can be used as a key for common key encryption used to send the message Msg to the system 210 over a network.

Next, the program executing module 110 performs the common key encryption on the message Msg using the common key Kc (D6) and sends the generated cryptogram to the system 210 (D7). The system 210 that receives the cryptogram decrypts the cryptogram using the common key Kc held by the system 210 and extracts the original message Msg (D8).

FIG. 6 is a diagram of a list of protection attributes of variables and function arguments (collectively referred to, hereinafter, as "variables") used during program creation, defined based on the implementation environment in FIG. 5. As shown in FIG. 6, according to the embodiments, six types of attributes (protection attributes) are provided depending on a protection level indicating a manner in which protection is performed. Each protection attribute has two types of direct properties regarding security requirements, integrity and confidentiality: whether a means of protection is provided in each memory area, and whether semantic verification is performed.

Here, "integrity" refers to a characteristic in which accuracy and completeness of information are protected. "Integrity" requires protection from alterations made by an external party. "Confidentiality" refers to a characteristic in which information is made unusable or unavailable to an unauthorized entity or process. "Confidentiality" requires that only a certain entity or process is permitted access.

The means of protection in the memory area may be dependent on a means of protection, such as access control, encryption, alteration verification, provided in the target system, and effects achieved may differ. For example, in a memory area (such as the protected memory area 132 in FIG. 1) including an access control mechanism completely prohibiting access from anywhere other than the program executing module 110, integrity and confidentiality are both protected. However, when access to all memory areas from anywhere other than the program executing module 110 is prohibited, inputting and outputting services provided by an OS become completely unavailable. Therefore, a memory area (unprotected memory area 131) that is not provided with protection functions that protect integrity and confidentiality must always be provided to allow inputting and outputting.

When the memory area is protected through encryption by hardware during memory access, only confidentiality may be protected in the memory area. When integrity is protected by a verification mechanism provided by hardware, only integrity may be protected in the memory area. When both encryption and the verification mechanism are combined, in a manner similar to access control, a protection mechanism providing protection of both integrity and confidentiality can be actualized.

Semantic verification indicates whether a value stored as a variable therein has been checked for one of integrity and confidentiality, or both. For example, even when integrity and confidentiality are protected in a protected memory area storing a certain variable, when a value obtained from an unprotected memory area is assigned to the variable, the value itself stored as the variable may have been altered or stolen at any point prior to being stored in the protected memory area. Therefore, even when the variable is assigned to the protected memory area, integrity and confidentiality of the value cannot be guaranteed. In other words, even when the integrity of the value itself at its assigned destination is guaranteed, if the integrity of a storage area storing therein a variable X from which the value is assigned is not protected, the value of the variable X may have been rewritten to another value when the variable X is referenced again. Therefore, the integrity of the value cannot be considered to be guaranteed.

In other words, to guarantee integrity and confidentiality of a value of a certain variable, both storage area assignment to a suitable protected memory area and semantic verification are required to be performed. The six types of protection attributes shown in FIG. 6 are designed based on an understanding that both storage area assignment to a suitable protected memory area and semantic verification are required to be performed. The protection attributes are largely classified into protection attributes (exposed) requiring storage in the unprotected memory area 131 and protection attributes (fixed, verified, hidden, concealed, and confidential) requiring storage in the protected memory area 132. Each protection attribute will be described hereafter.

An "exposed" attribute is provided for input and output variables. The "exposed" attribute is added to a variable held in a memory area in which neither integrity nor confidentiality is protected. In other words, because the "exposed" attribute is added to the variable held in the memory area (unprotected memory area 131) in which neither integrity nor confidentiality is protected, external entities, such as the OS, can freely read and rewrite the variable with the "exposed" attribute.

The memory area holding the variable to which the "exposed" attribute is added does not provided a protection function. Therefore, semantic integrity and confidentiality of the value are not guaranteed. Even when a value is a confidential value that had been held until this point in an area in which confidentiality is protected, once the value is copied to the variable with the "exposed" attribute, confidentiality of the value, as well as that of the value stored in the variable from which the value is copied, deteriorates. To clarify differences between the "exposed" attribute and other protection attributes in the descriptions below, an "exposed" attribute that is not directly involved in security improvement is implied. However, to maintain compatibility with existing programs and to avoid complications regarding description, the "exposed" attribute can be omitted from program descriptions.

A "fixed" attribute is added to a variable that is stored in a memory area in which alteration is prevented, but holds a value of which semantic integrity and confidentiality are not verified. The variable with the "fixed" attribute can be inter-converted with a variable with the "exposed" attribute in exceptional cases. For example, when a data structure extending over a plurality of words and having the "exposed" attribute is referenced, the data structure may receive an alteration attack while being referenced. When an attack such as this occurs during an integrity verification of a value in particular, the verification becomes meaningless. To eliminate such risk, the alteration of data during the verification can be prevented by data being verified after the overall data structure is copied to the variable with the "fixed" attribute.

More specifically, a latent example of the above-described vulnerability can be seen during the following three variable declarations and a verification function PublicVerifyRSA call.

verified PubCert_RSA Cert_Accept_A
const verfied PubKey_RSA PubKey_CA
exposed PubCert_RSA Cand_Input
PublicVerifyRSA(Cand_Input, PubKey_Ca, Cert_Accept_A)

In the above-described example, the "exposed" attribute is added to a first argument Cand_Input of PublicVerifyRSA. Therefore, a value of Cand_Input may be rewritten at an arbitrary timing from outside the program.

Here, assuming that each word forming the first argument Cand_Input of the function is read only once when the function is processed, when a word on the memory is altered by an attacker, the alteration can be considered to have occurred outside of program processing. Effect of the alteration is equal to a message alteration made over a network from the viewpoint of the following processing, because the alteration will be detected by verification of the argument Cand_Input. Therefore, security of the verifying process is unaffected. However, when the value of Cand_Input is repeatedly referenced within the function, if an attacker that has knowledge of operation timings of the program makes an alteration such that a different value is read every time the value is repeatedly referenced, the rewriting cannot be considered equivalent to the message alteration made over a network. This is an attack referred to as a "fault attack" in an encryption process and is more difficult to counter.

Therefore, when a value of a variable is repeatedly referenced, the value of the variable with the "exposed" attribute is once copied to the variable with the "fixed" attribute. As a result, a possibility of the value being rewritten by an external party can be eliminated even when the value is referenced a plurality of times.

A "verified" attribute is added to a variable that is stored in a memory area in which alteration is prevented, and of which the semantic integrity of the value is guaranteed but confidentiality is not. Assignment to a variable with the "verified" attribute is limited by a calculation result of a variable with a same attribute. However, assignment of the variable with the "verified" attribute to the variable with the "exposed" attribute or the "fixed" attribute is ordinarily permitted. When an output process using the variable is not performed, the privacy of the memory area can be protected.

A "hidden" attribute is added to a variable that is stored in an area in which confidentiality is protected, and has insufficient semantic confidentiality and integrity. The "hidden" attribute differs from the "fixed" attribute in that assignment between the variables with the "hidden" attribute and the variables with the "exposed" attribute and the "fixed" attribute is prohibited, and input and output is not performed.

A "concealed" attribute is added to a variable that is stored in an area of which confidentiality is protected, and has semantic confidentiality but does not have integrity.

A "confidential" attribute is added to a variable that is stored in an area in which confidentiality is protected and has alteration protection, and of which both semantic confidentiality and integrity are verified.

In FIG. 6, "−" in an "alteration prevention (memory)" column associated with each protection attribute indicates that an alteration prevention function is not required to be provided in a memory area in which a variable with the protection attribute is stored. "+" indicates that the alteration prevention function is required to be provided in the memory area in which the variable with the protection attribute is stored. "±" indicates that the memory area can be arbitrarily provided with the alteration prevention function.

In FIG. 6, "−" in a "privacy (memory)" column associated with each protection attribute indicates that a privacy function is not required to be provided in a memory area in which a variable with the protection attribute is stored. "+" indicates that the privacy function is required to be provided in the memory area in which the variable with the protection attribute is stored. "±" indicates that the memory area can be arbitrarily provided with the privacy function is arbitrary.

In FIG. 6, "×" in an "integrity verification (semantic)" column associated with each protection attribute indicates that integrity verification is required for a variable having the protection attribute. "○" indicates that the integrity verification is not required for the variable having the protection attribute.

In FIG. 6, "×" in a "confidentiality (semantic)" column associated with each protection attribute indicates that confidentiality verification is required for a variable having the protection attribute. "○" indicates that the confidentiality verification is not required for the variable having the protection attribute.

Among the six protection attributes described above, "exposed", "verified", "concealed", and "confidential" are fundamentally important protection attributes. "Fixed" and "hidden" are supplementary protection attributes.

The above-described protection attributes can be considered similar to variable types in a language. However, a type in an ordinary language often refers to a data type, such as a number of fields and length. In the example below, a strict match is required regarding protection attribute types. However, to simplify explanation, strict restrictions are not placed on data type. According to the embodiments, consistency between data types is secondary. Therefore, the term "protection attribute" is used for attributes related to improvement in security. The protection attributes can also be grouped by data types.

FIG. 7 is a diagram of whether assignment is possible between variables with each of the above-described protection attributes. As shown in FIG. 7, the variables with the "confidential" attribute, the "concealed" attribute, and the "hidden" attribute having confidentiality are not permitted to be inter-converted or assigned to variables other than those with the same protection attribute. The variables with the "verified" attribute having both memory protection and semantic verification regarding integrity can be assigned to variables with the "exposed" attribute and the "fixed" attribute. However, the variables with the "exposed" attribute and the "fixed" attribute cannot be assigned to the variables with the "verified" attribute. Assignment can be freely performed between the variables with the "exposed" attribute and the variables with the "fixed" attribute. The assignment conversion rules shown in FIG. 7 are stored in the storage unit 36 in advance.

Next, security functions used during program creation by the program developing device 300 will be described. Here, a "security function" refers to a function actualizing a so-called security primitive and having a computationally one-way characteristic, such as encryption, decryption, and signature verification.

FIG. 8 is a diagram of a list of types of security functions defined based on the implementation environment shown in FIG. 5. As shown in FIG. 8, the security functions are largely divided into five classifications: a public key encryption function (encryption and decryption), a public key signature function (generation and verification), a common key encryption function (encryption and decryption), a common key signature function (generation and verification), and a random number generation function. Here, as middle classifications of the security functions excluding the random number generation function, operations (methods) are defined to form a pair, such as encryption and decryption, and signature generation and verification. A security function (security function name) is defined for each operation. As a middle classification of the random number generation function, a physical random number is defined. As a supplementary classification of the physical random number, three security functions (physical random numbers A, B, and C) are defined.

For example, regarding the public key encryption, two security functions (PublicEncryptXXX) with different input and output protection attributes, described hereafter, are defined. Here, as supplementary classifications, a name uniquely identifying each security function is defined. Last three characters of a security function name (XXX or YYY) can be set to an arbitrary character string (such as an encryption and decryption method name). The security function name is not limited to the example in FIG. 8, and can be given an arbitrary function name. In FIG. 8, all security functions corresponding to a same operation content are given a same name. However, the security functions can be given different names. In this case, overloading, described hereafter, does not occur.

In FIG. 8, a "type" of data input as an argument and the "protection attribute" of the data are defined for each security function in an "input" column. For example, when a plain text is entered in the security function related to the public key encryption, the plain text is defined as having the "confidential" attribute or the "concealed" attribute.

In FIG. 8, the "protection attribute" of the data entered as the argument in each security function when the data "type" is the public key or the private key is defined as a special case in a "key value (special input)" column. For example, when a public key is entered in the security function related to the public key encryption, the public key is defined as having the "verified" attribute.

In FIG. 8, a "type" of data output as a result of data processing using each security function and the "protection attribute" of the data are defined in an "output" column. For example, a cryptogram output fro the security function related to the public key encryption is defined as having the "verified" attribute or the "exposed" attribute.

Here, when focus is placed on the security functions related to the public key and the common key, it is clear that multiple security functions with a same name are defined (overloaded) based on the protection attribute of one of input data and output data or both, even when the operation content is the same.

Moreover, in FIG. 8, a "type" of data additionally output as a result of data processing by the security function and the "protection attribute" of the data are defined in a "supplementary output" column. Specifically, the protection attribute required for a signature verification result by the public key and a signature verification result by the common key are defined.

The security function (PseudoRandom) corresponding to the physical random number indicates that a random number is output (generated) without data input being performed. The protection attribute of the random number is defined as being any of the "confidential" attribute, the "concealed" attribute, and the "verified" attribute.

According to the embodiments, security functions with different protection attributes when the data is input and output always provide a security primitive function having one-wayness when a calculation, such as encryption, decryption, signature generation, and verification, is performed. In other words, the security functions are limited to unidirectional functions. Here, a "security function with different protection attributes when the data is input and output" refers to a security function that has different protection attributes depending on whether the data is input or output. For example, when the security function is provided with the "confidential" attribute when the input is plain text and the "verified" attribute when the input is the public key, the output has the "verified" attribute. When a calculation result of a variable of which the confidentiality is protected is assigned to an unprotected variable, information on the original variable of which the confidentiality is protected may be leaked when the unprotected variable is output to an external destination. The mechanism described above aims to limit processes to encryption and the like, without allowing unrestricted calculations such as that above.

According to the embodiments, when all input and output arguments of a certain function have the same protection attribute, the function is not considered to be a security function. Specifically, even when the calculation content is encryption calculation, the function is defined as not being a security function if not even one variable is present that has different protection attributes depending on whether the data is input or output. Moreover, even when the function is overloaded, when the protection attributes of all arguments match based on respective definitions, the function is not considered to be a security function. In this case, computational one-wayness is not required. Although the security function is always required to have computational one-wayness, a unidirectional function is not necessarily required to be defined as the security function.

FIG. 9 is a diagram explaining a public key signature verification function that is a security function described above. Here, the public key signature verification function is described as being in RSA signature format (PublicVerifyRSA, described hereafter). However, a signature format is not limited thereto.

Generally, in signature verification, a hash value decrypted from a signature using a signature verification key and a hash value calculated from a pre-verification message object are compared. Only information (0/1) indicating whether the hash values match as a result of the comparison is output. On the other hand, in the public key signature verification function shown in FIG. 9, a variable area is reserved in a memory area based on a protection attribute (verified/confidential) of a post-verification message object to be output. Here, a value (pre-verification message object) copied from a variable to be verified is output to a variable that is newly secured based on the protection attribute, only when both hash values match. When the hash values do not match, the copied, pre-verification message object is destroyed.

When a pre-verification variable is secured in the unprotected memory area 131 or, in other words, the variable has the "exposed" attribute an attacker may rewrite the pre-verification variable during verification or immediately after verification. Therefore, an intent behind the public key signature verification function described above is to copy the value to be verified to the protected memory area 132 in advance to prevent the value from being rewritten. Because the pre-verification variable and the post-verification variable hold the same value, there is a functional vulnerability in that the program is executed when the variables are erroneously used. However, because the variable output after verification has a different protection attribute from the variable input before verification, the pre-verification variable can be prevented from being erroneously used after verification. In this way, as a result of the memory area being secured based on the protection attribute during calculation in the security function, data security can be improved.

Next, non-security functions excluding the above-described security function used during program development performed by the program developing device 300 will be described.

FIGS. 10A and 10B are diagrams of examples of the non-security functions. As shown in FIG. 10A, "Input" and "Output" related to input and output are provided as non-security functions for input and output performed via the OS. Here, because the OS writes to the "Input", an input variable is limited to having only the "exposed" attribute. Because a writing operation by the OS is not required for an output argument in the "Output", the output argument is overloaded with both the "exposed" attribute and the "verified" attribute. In addition, all so-called service functions performing a bi-directional exchange of data with the OS have only the "exposed" attribute.

As shown in FIG. 10B, "Extract" and "Concat" are provided as non-security functions for data format conversion. The functions only perform conversion and calculation of data format within a software module, and do not perform data input and output via the OS. Arguments of security functions such as these can have protection attributes under a condition that all input and output arguments have a same protection attribute. However, a variable having different attributes depending on input and output, such as the security functions, cannot be present. All arguments within a single function have only one protection attribute. For example, functions providing a same function as "Extract" can be respectively defined with different names as a function having the "verified" attribute, a function having the "concealed" attribute, and a function having the "confidential" attribute. Alternatively, each function can provide a function corresponding to respective protection attributes by function overload, as described above.

Hereafter, the assignment conversion rules in FIG. 7, the list of security functions in FIG. 8, and the list of non-security functions in FIGS. 10A and 10B are collectively referred to as a "security function set".

Next, an example of a program list (referred to, hereinafter, as a pseudo program list) describing processing contents of processes performed on the program executing module 110 side in the security protocol using the security functions and the non-security functions is shown with reference to FIG. 11. The pseudo program list is held in a storage area that can be referenced by the CPU 31, such as in the RAM 35 or the storage unit 36.

In FIG. 11, lines 2 to 4 express variable declarations provided with initial values. Lines 6 to 11 express parameters for data format conversion. Lines 14 to 25 express variable declarations for operational variables. The protection attributes are defined by the variable declarations and parameter declarations Lines 29 to 52 describe detailed contents of the processes performed by the program executing module 110 side in the security protocol. Here, a timing at which encrypted output data is disclosed outside of the program executing module 110 requires care. Although it intuitively appears that the output data is disclosed to the OS at a timing at which an Output function is called at line 52, the OS is merely notified of the presence of the output data and a buffer address in a process at line 52. In terms of safety, it is thought that, if an attacker periodically monitoring an unprotected memory area for output is present, the attacker is able to observe the output data when encrypted data EncTxt stored in a protected area is copied to the unprotected area or, in other words, when a Concat function is called at line 50.

According to the embodiments described below, explanations are given based on the pseudo program shown in FIG. 11. However, the variable declarations and the contents of the processes are not limited to the example. The pseudo program can be created by the program developing device 300. Alternatively, the pseudo program can be created by another device.

Figure 12:
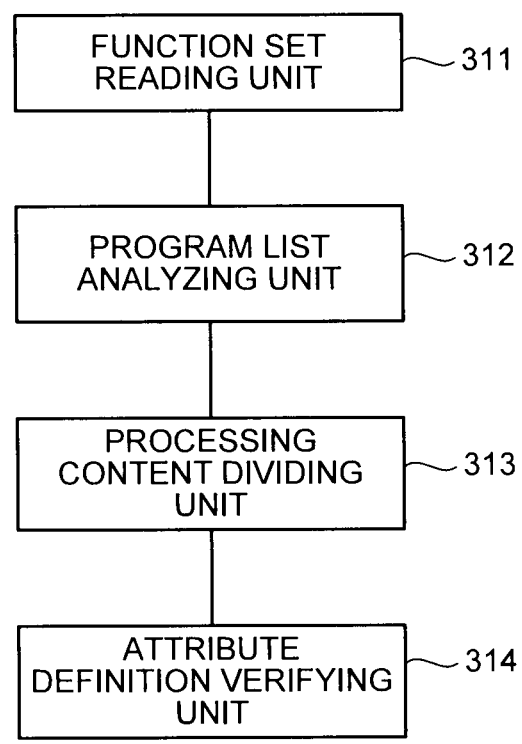
FIG. 12 is a block diagram of a functional configuration of a program developing device according to a first embodiment of the present invention.

Next, a functional configuration of the program developing device 300 according to a first embodiment of the present invention will be described. FIG. 12 is a block diagram of the functional configuration of the program developing device 300 according to the first embodiment. The program developing device 300 according to the first embodiment includes a CPU 31, a function set reading unit 311, a program list analyzing unit 312, a processing content dividing unit 313, and an attribute definition verifying unit 314. The function set reading unit 311, the program list analyzing unit 312, the processing content dividing unit 313, and the attribute definition verifying unit 314 are functional units actualized by the CPU 31 in cooperation with a predetermined program stored in the ROM 34 or the storage unit 36.

The function set reading unit 311 reads out a security function set (the assignment conversion rules, the security function list, and the non-security function list) stored in the storage unit 36.

The program list analyzing unit 312 references a program list that is a verification subject, held in the storage unit 36 or the like, and analyzes declaration portions described in the program list, thereby acquiring protection attributes provided to variables and parameters.

The processing content dividing unit 313 references the program list that is the verification subject, held in the storage unit 36 or the like, and divides a series of processes (for example, lines 29 to 52 in FIG. 11) described in the program list, thereby generating a plurality of partial processes. Here, a unit of division can be arbitrarily set. For example, a minimum unit of division is individual formula operations and assignments, or a function-call unit. However, the unit of division can be a formula including a plurality of operations and assignments.

Only processes related in terms of data flow are included in each unit of division when the series of processes are divided. A plurality of processes that are not related in terms of data flow are not divided into a same partial process. For example, operations such as A=B; C=D cannot be collectively included in a single unit of division. The operations are respectively divided into A=B and C=D. As a result, the security functions and the overloaded functions can be respectively processed as verification subjects, described hereafter.

The attribute definition verifying unit 314 judges whether a protection attribute of an actual argument in a verification subject matches a protection attribute defined in the security set, with each partial process divided by the processing content dividing unit 313 serving as the verification subject. When the attribute definition verifying unit 314 judges that protection attributes do not match, the attribute definition verifying unit 314 outputs error information indicating a section in which the protection attributes do not match.

Operations performed by the program developing device 300 according to the first embodiment will be described below. Hereafter, in addition to the definitions of the non-security functions in FIGS. 10A and 10B, definitions of security functions in FIG. 13 will be used in the security function set.

Here, the security functions in FIG. 13 will be described. Like FIG. 8, FIG. 13 shows types of security functions and defines the type of each security function described in the pseudo program list in FIG. 11. "PublicDecryptRSA" is a public key decryption function that performs the public key decryption in RSA format. Two "PublicDecryptRSA" with the same function name are defined. The two "PublicDecryptRSA" have different protection attributes depending on input and output. However, because the function names are the same name, the two "PublicDecryptRSA" are in a mutually overloaded relationship. As described above, overloading does not occur when the function names of both functions differ. Moreover, even when the protection attributes are the same, overloading does not occur when the function names differ.

"PublicVerifyRSA" is a public key signature detection function that performs the public key verification in RSA format. Two "PublicVerifyRSA" with the same function name are defined. The two "PublicVerifyRSA" have different protection attributes depending input and output. However, because the function names are the same name, the two "PublicVerifyRSA" are in a mutually overloaded relationship. "CommonEncryptAES" is a common key signature encryption function that performs the common key signature encryption in AES format. Two "CommonEncryptAES" with the same function name are defined. The two "CommonEncryptAES" have different protection attributes depending on input and output. However, because the function names are the same name, the two "CommonEncryptAES" are in a mutually overloaded relationship, like the "PublicDecryptRSA" and the "PublicVerifyRSA" described above.

Hereafter, explanations are given using the definitions of the security functions in FIG. 13. However, application is not limited to the example. Other security functions can also be added and used. However, as described above, it is preferable that the security function is based on a one-way operation. An arbitrary operation that does not meet this condition is not defined as a security function.

Figure 14:
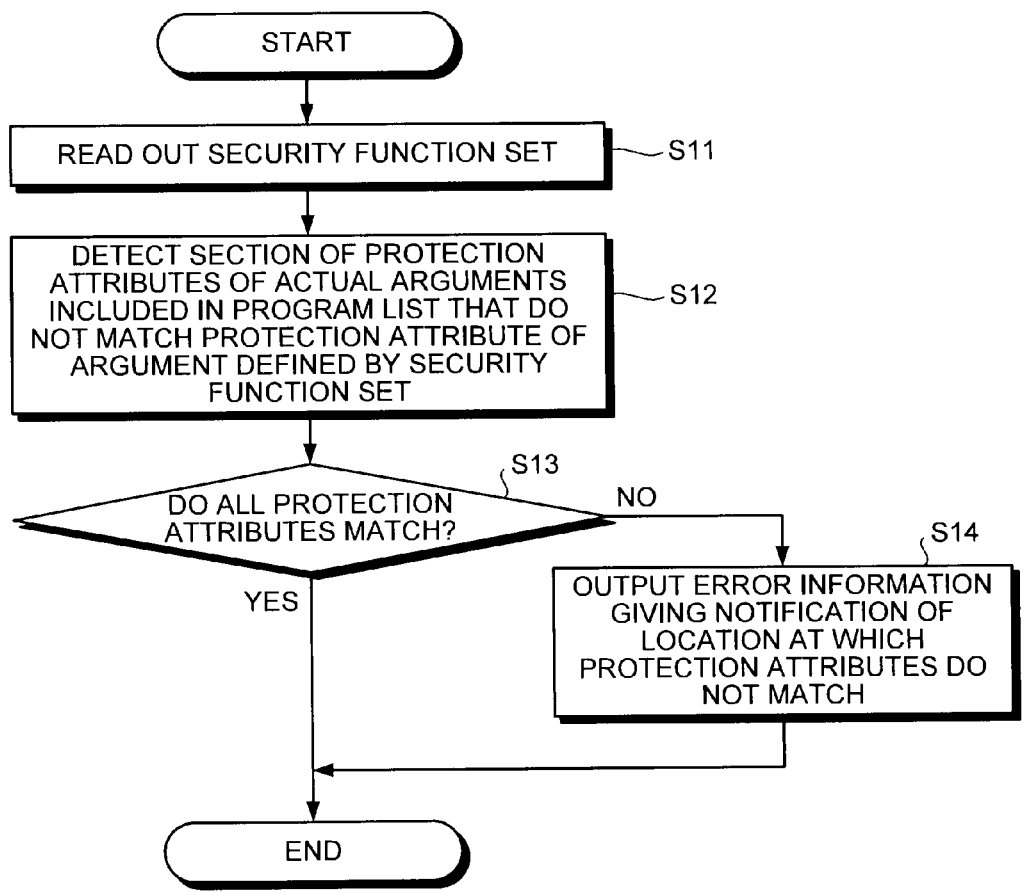
FIG. 14 is a flowchart of an overview of a protection attribute verifying process according to the first embodiment.

FIG. 14 is a flowchart of an overall process related to verification of the program list. The process shows a basic process related to verification of the program list. When the security function is not overloaded, the process can be applied as is. A process used when the security function is overloaded will be described hereafter.

First, the function set reading unit 311 reads out the security function set stored in the storage unit 36 (Step S11).

Next, the attribute definition verifying unit 314 detects a section in protection attributes of actual arguments in operations and assignments between variables, and function-calls included within the program list that is the verification subject that do not match with the protection attribute of the argument in each security function defined by the security function set (Step S12).

Specifically, the attribute definition verifying unit 314 identifies the protection attribute of the actual argument related to input and output of the security function and the protection attribute of the actual argument related to input and output of the non-security function, based on the protection attribute defined for each variable. The attribute definition verifying unit 314 judges whether the protection attribute of the actual argument related to the input and output of the security function matches the protection attribute of the argument of the type of security function in the security function list corresponding with the name of the security function. The attribute definition verifying unit 314 can also judge whether a conversion of the protection attribute in the non-security function complies with conversion laws of the protection attributes prescribed by the assignment conversion rules.

When the attribute definition verifying unit 314 judges at Step S12 that all protection attributes match (Yes at Step S13), the process is completed. On the other hand, when the attribute definition verifying unit 314 detects a section in which the protection attributes do not match (No at Step S13), the attribute definition verifying unit 314 outputs the error information giving notification of a location at which the protection attributes do not match (Step S14) and completes the process.

An inspection of whether the protection attributes match in a direct operation between variables can be actualized by a simple comparison for matches. However, when an overloaded security function is included, a required process is slightly complicated. In other words, when a security function described in the program list is overloaded, a function to which the protection attribute corresponds is required to be identified from the combination of protection attributes of the arguments related to input and output.

Figure 15:
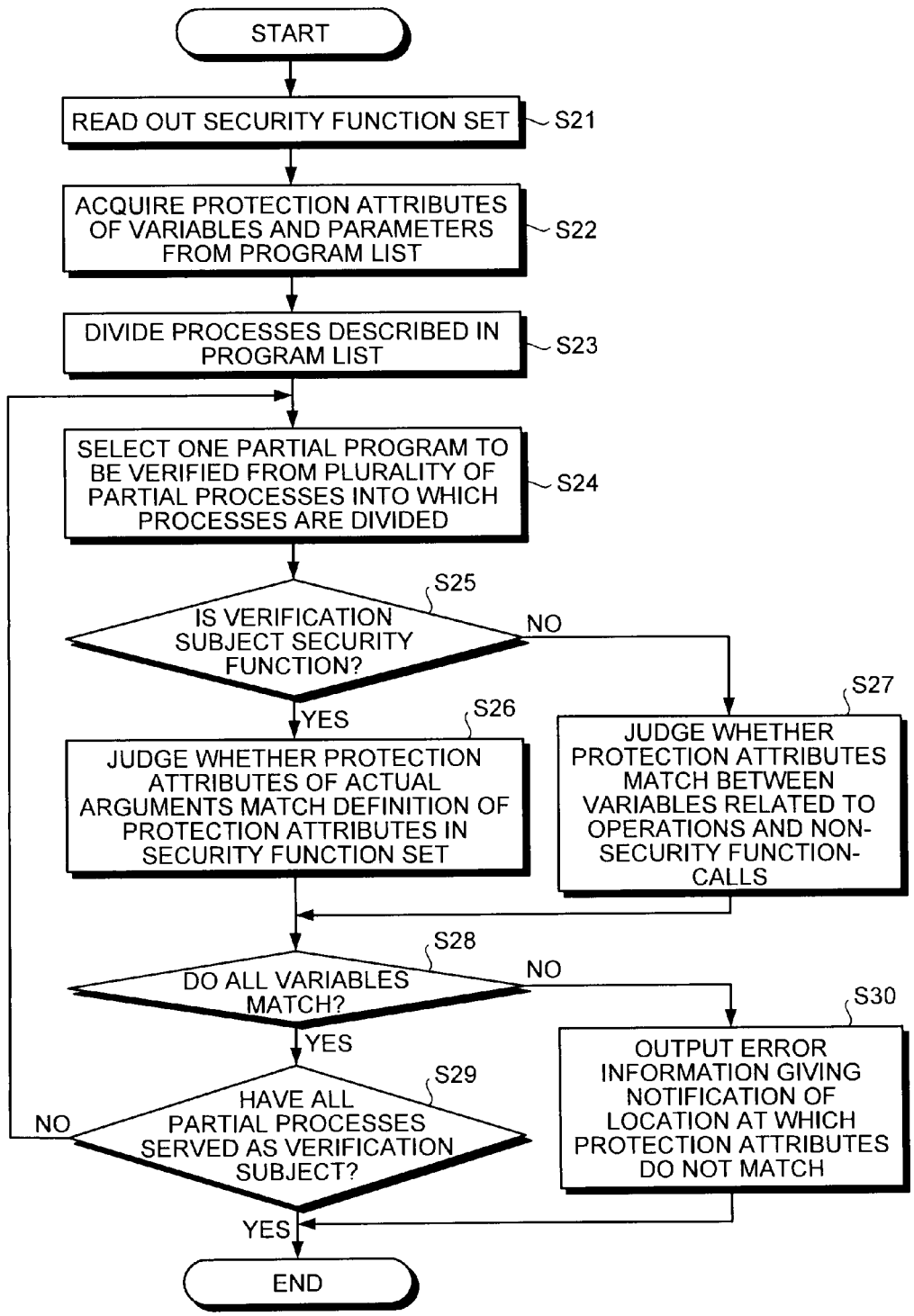
FIG. 15 is a flowchart of details of the protection attribute verifying process according to the first embodiment.

FIG. 15 is a detailed flowchart of the protection attribute verifying process, taking into consideration overloading. First, the function set reading unit 311 reads out the security function set stored in the storage unit 36 (Step S21).

Next, the program list analyzing unit 312 references the program list to be verified and analyzes the declaration sections described in the program list, thereby acquiring the protection attributes provided to the variables and parameters (Step S22).

Next, the processing content dividing unit 313 references the program list to be verified and divides the series of processes described in the program list into predetermined units (Step S23). The attribute definition verifying unit 314 selects a partial process as the verification subject from the plurality of partial processes into which the series of processes has been divided at Step S23 (Step S24). The attribute definition verifying unit 314 compares the verification subject with each security function name in the security function list read at Step S21, thereby judging whether the verification subject is the security function (Step S25).

When the attribute definition verifying unit 314 judges at Step S25 that the verification subject is the security function (Yes at Step S25), the attribute definition verifying unit 314 identifies the protection attribute of the actual argument related to the input and output of the security function and the protection attribute of the actual argument related to the input and output of the non-security function based on the protection attribute defined for each variable. Then, the attribute definition verifying unit 314 then identifies the security function corresponding to the protection attribute of the actual argument from the type of overloaded security function for the function (Step S26).

Here, the process at Step S26 will be described with reference to an example. In the definition of the security function in FIG. 13, the security function of the public key signature verification is overloaded (public key signature verification A and public key signature verification B). Here, the protection attributes differ for signature input and output text. However, the protection attributes of the public key for verification have the "verified" attribute in both instances.

On the other hand, in the security function (PublicVerifyRSA) for public key verification at line 32 of the pseudo program in FIG. 11, the protection attribute of "PubKey_CA" serving as the actual argument is the "verified" attribute (declared at line 2). The protection attribute matches with that of a dummy argument. Protection attributes of actual arguments "Cand_Input" and "Cert_Accept" that are the signature input and the output text dependent on overloading are respectively the "exposed" attribute and the "verified" attribute (declared at lines 18 and 19). From these protection attributes related to the input and output, the attribute definition verifying unit 314 judges that the security function at line 32 of the pseudo program matches a definition of the public key signature verification B in the definitions of the security functions in FIG. 13. The attribute definition verifying unit 314 identifies the security function to be the public key signature verification B.

In this way, at Step S26, the attribute definition verifying unit 314 judges whether the protection attribute of the argument related to the security function included in the program list matches any definition of the types of security functions included in the security function list, based on attributes of each variable defined in the declaration sections of the program list.

When, as a result of the process at Step S26, the attribute definition verifying unit 314 judges at Step S26 that the security function of the verification subject matches the type of security function defined in the security function set (Yes at Step S28), the process proceeds to Step S29. When, as a result of the process at Step S26, the attribute definition verifying unit 314 judges that the security function of the verification subject does not match the type of security function defined in the security function set (No at Step S28), the process proceeds to Step S30.

On the other hand, when the attribute definition verifying unit 314 judges at Step S25 that the verification subject is other than the security function, such as a calculation formula or a non-security function (No at Step S25), the attribute definition verifying unit 314 judges whether the actual arguments of all operations and non-security function-calls related to the verification subject have the same protection attribute as defined in the security function set (the assignment conversion rules and the non-security function list) (Step S27).

When, as a result of the process at Step S27, the attribute definition verifying unit 314 judges that the variables and constants related to all operations included in the verification subject and the actual arguments of the non-security function-calls have the same protection argument (Yes at Step S28), the process proceeds to Step S29. When, as a result of the process at Step S27, the attribute definition verifying unit 314 judges that the variables and constants related to all operations included in the verification subject and the actual arguments of non-security function-calls do not have the same protection argument (No at Step S28), the process proceeds to Step S30.

At Step S29, the attribute definition verifying unit 314 judges whether all partial processes into which the series of processes has been divided at Step S23 have served as the verification subject. When an unprocessed partial process is present (No at Step S29), the process returns to Step S24 and the unprocessed partial process is selected as the verification subject. When, at Step S29, the attribute definition verifying unit 314 judges that all partial processes have served as the verification subject (Yes at Step S29), the process is completed.

At Step S30, the attribute definition verifying unit 314 outputs the error information giving notification of the location at which the protection attributes are judged not to match at Step S28 (Step S30), and the process is completed.

Here, to check an effect of an erroneous detection by the protection attribute verifying process, an instance in which a programmer gives a private key "PrvKey_B" an erroneous protection attribute is considered. When, for example, the private key "PrvKey_B" is given the "exposed" attribute, an attacker that is able to reference the memory can view and alter the variable because the variable is disposed in the unprotected memory area. Even when the private key "PrvKey_B" is given the "verified" attribute or the "concealed" attribute, confidentiality or integrity may be compromised when the protected memory area is for the "verified" attribute and used to protect integrity or when the protected memory area is for the "concealed attribute" and used to protect confidentiality.

That the protection attribute verifying process can detect error in the protection attribute will be described using a table shown in FIG. 16 created from the pseudo program list in FIG. 11. FIG. 16 is a diagram of the protection attributes and error detection results determined using the protection attribute verifying process in FIG. 15. In FIG. 16, each line corresponds to a variable or a parameter defined in the pseudo program list. A "definition" column indicates a program line (L2 indicates line 2) at which the variable or parameter is defined. A "variable name" column, a "remarks column, a "protection attribute" column, and a "meaning" column are subsequently shown.

Moreover, inspection results determined using the protection attribute verifying process are shown in subsequent columns. The inspection results are those obtained when the "protection attribute" of the variables or parameters at the lines in the program list indicated in the "definition" column and the "variable name" column are respectively rewritten to the "exposed" attribute, the "verified" attribute, the "concealed" attribute, and the "confidential" attribute. The "fixed" attribute and the "hidden" attribute are not used in the program and are, therefore, omitted.

As shown in FIG. 16, for example, when the protection attribute of the "PrvKey_B" defined at line 3 of the program list is respectively rewritten to the "exposed" attribute, the "verified" attribute, and the "concealed" attribute, an error is detected as the inspection results. An inspection is only successful when the protection attribute is a normal "confidential" attribute. In a subsequent "error line" column, a line in the program at which an inspection failure has been detected, namely the error information giving notification of the location at which the protection attributes do not match in the process at Step S31, is shown.

Similar results are obtained for variables other than the "PrvKey_B". When the protection attribute given to each variable is correctly provided through examination of the protocol, even when a protection attribute of a single variable is erroneously provided, the error can be detected. When, for example, a private key is erroneously given the "exposed" attribute and the error is not caught, the private key is disposed in the unprotected memory area. As a result, confidential information will be leaked. However, through application of the above-described protection attribute verifying process, even when the programmer erroneously describes the protection attribute of a variable by a simple error, the error can be detected beforehand, preventing problems such as information leakage.

As described above, according to the first embodiment, whether the protection attribute of the argument related to the input and output of the security function described in the program list match with an originally prescribed protection attribute is judged. When the protection attributes are judged not to match, the error information stating that the protection attributes do not match is output. Therefore, validity of a manner in which a piece of data that should be protected is protected, described in the program list, can be verified.

Procedures of the protection attribute verifying process described above are not intended to eliminate vulnerabilities such as buffer overflow. Therefore, technology for eliminating known vulnerabilities is preferably used in combination with the protection attribute verifying process. In particular, use of variables that have not yet been initialized is dangerous in terms of soundness of the protocol. However, because initialization is not included in the above-described procedures, separate measures are preferably taken.

According to the first embodiment, an aspect in which the series of processes described in the program list are performed divided into partial process units based on the security functions is described. However, other methods can be used. According to a second embodiment of the present invention, an aspect is described in which a data flow graph indicating a flow of data within a program list is divided based on security functions. An error analysis of protection attributes is performed in partial data flow units into which the data flow graph has been divided. Elements similar to those in the program developing device according to the first embodiment are given the same reference numbers. Explanations thereof are omitted.

Figure 17:
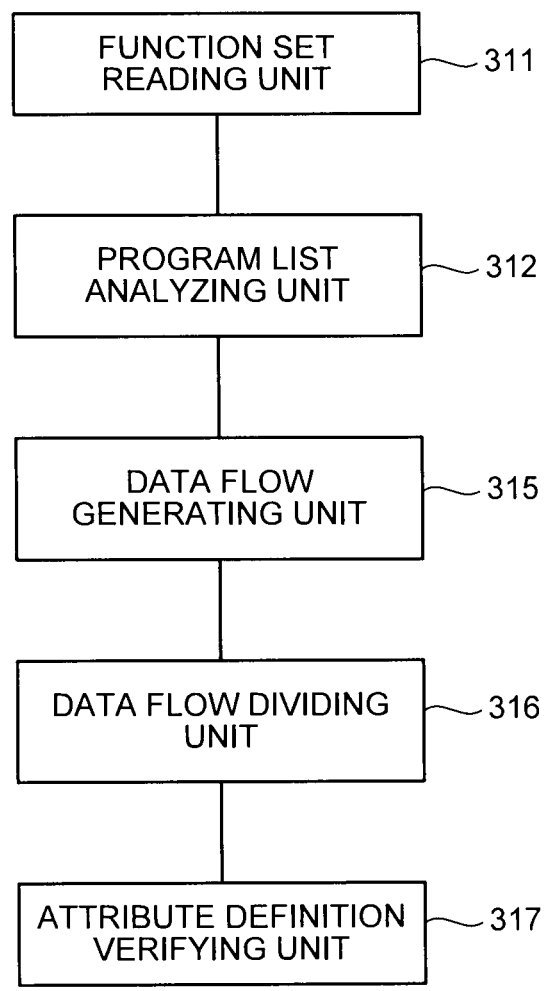
FIG. 17 is a block diagram of a functional configuration of a program developing device according to a second embodiment of the present invention.

FIG. 17 is a block diagram of a functional configuration of the program developing device 300 according to the second embodiment. The program developing device 300 according to the second embodiment includes a CPU 31, a function set reading unit 311, a program list analyzing unit 312, a data flow generating unit 315, a data flow dividing unit 316, and an attribute definition verifying unit 317. The function set reading unit 311, the program list analyzing unit 312, the data flow generating unit 315, the data flow dividing unit 316, and the attribute definition verifying unit 317 are functional units actualized by the CPU 31 in cooperation with a predetermined program stored in the ROM 34 or the storage unit 36.

The data flow generating unit 315 generates a data flow graph indicating a flow of data in each process described in the program list, based on an analysis result from the program list analyzing unit 312.

Figure 18:
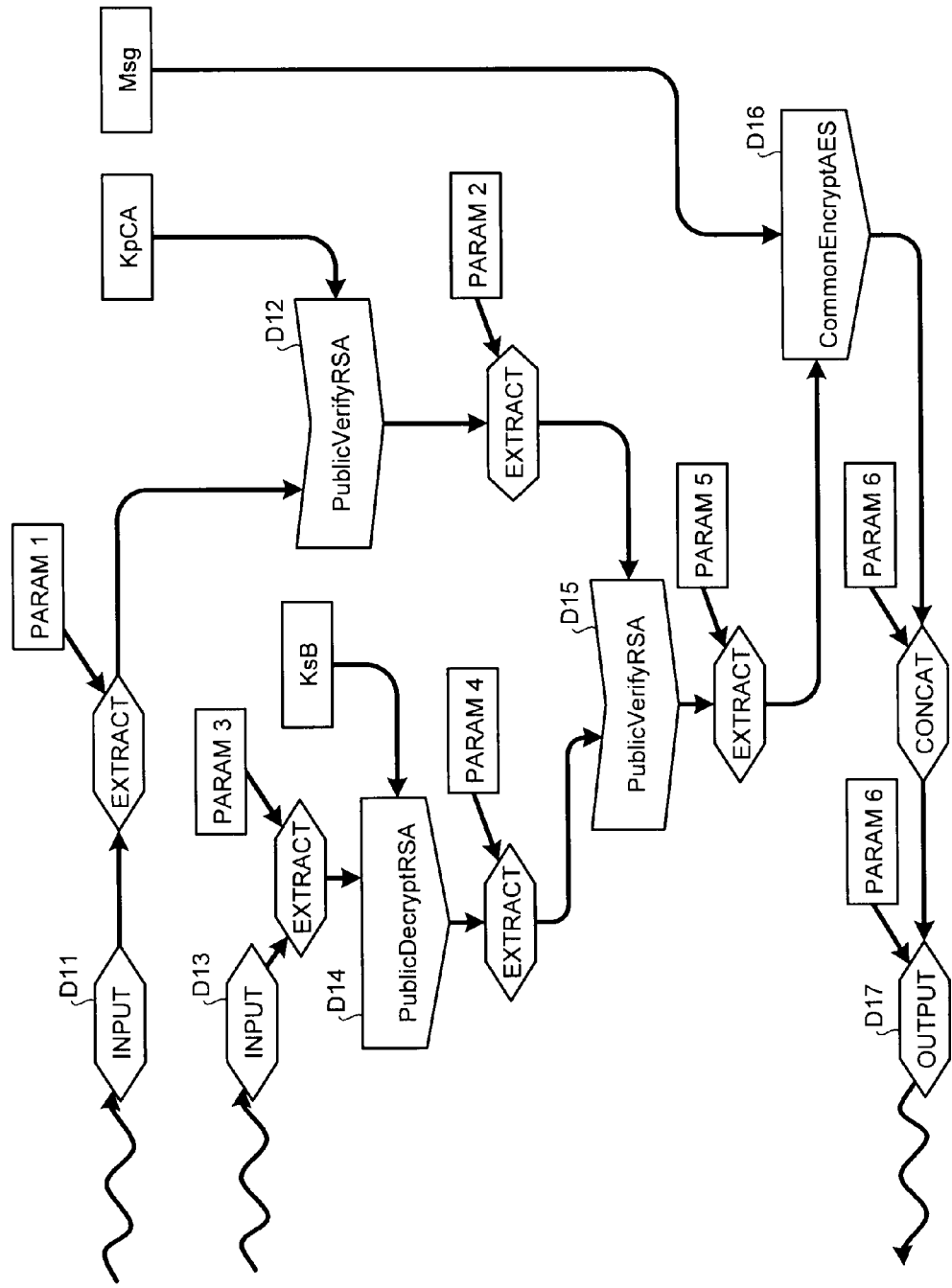
FIG. 18 is a diagram of an example of a data flow graph.

FIG. 18 is a diagram of an example of a data flow graph generated by the data flow generating unit 315. A data flow of the processes performed in the pseudo program list in FIG. 11 is shown. External input and output performed by non-security functions Input and Output are indicated by D11, D13, and D17 on a left side of FIG. 11. D11, D13, and D17 respectively correspond to D1, D3, and D7 in FIG. 5.

Non-security functions other than Input and Output are indicated by hexagonal (tortoise shell-shaped) symbols in FIG. 18. Constants (confidentiality values) related to security and parameters, such as bit field and size, are indicated by rectangular symbols. "KpCA", "KsB", and "Msg(Secret-Message)" correspond to pieces of data with the same names in FIG. 5.

Among the security functions, D12 and D15 related to public key signature are indicated by hexagonal (arrowhead-shaped) symbols. D14 and D16 related to public key decryption and common key encryption are indicated by pentagonal symbols. D12, D14, D15, and D16 respectively correspond to D2, D4, D5, and D6 in FIG. 5.

The data flow dividing unit 316 in FIG. 17 divides the data flow graph generated by the data flow generating unit 315 into security function input and output units, generating a plurality of partial data flows. The data flow dividing unit 316 then registers the generated partial data flows in a data flow table with attribute information corresponding to an element (constituent elements) forming each partial data flow. The data flow dividing unit 316 also generates a function overload defining table for holding actual arguments successively decided in a protection attribute verifying process described hereafter.

Operations performed by the data flow dividing unit 316 will be described below with reference to FIGS. 18 and 19. When a continuous data flow graph shown in FIG. 18 is divided into security function input and output units, the data flow graph can be divided into 10 partial flow graphs shown in a table in FIG. 19 (data flow table). An end point of each partial flow graph is always any of five items, the five items being input, output, initial values (unprotected and protected), and an argument of a security function.

In FIG. 19, reference values of the input and output, security functions, and input and output functions in FIG. 18 are expressed by "#reference number_variable name". In particular, an argument of a function is expressed by "#reference number_variable name(#reference number of argument)". This is to clarify differences between the protection attribute of each argument. The reference numbers of arguments of the input and output functions are also similarly described. This is to clarify which variable is clearly an input of the program and which variable is an output. When the input and output of the program is viewed from a variable level, even a simple operation in which only input is performed cannot be performed unless an implicit output of, for example, an input buffer size and parameters is made to the OS 14. An output operation is performed even for some variables in an input function. Therefore, clarification of the arguments is made to strictly differentiate between the input and the output.

On the other hand, "Extract" and "Concat" functions that are bit field operation functions perform operations within the program without calling the OS. Therefore, in FIG. 19, arguments thereof are omitted. The same can apply to operations described in operator form, although such operations are not used in the program.

The partial data flows into which the data flow graph has been divided will be described in detail. In FIG. 19, in partial data flow number 1, a data flow starts with a first argument of the Input function D11. A Param1 assigned to a variable buf by an input operation being performed is input to the non-security function Extract. A bit field specified by the constant Param1 is extracted and assigned to the variable Cand_Input. Next, Cand_Input is input as a first argument of the Public Verify RSA function D12. Because the Public Verify RSA function D12 is a security function, the data flow is divided here.

In partial data flow number 2, the public key KpCA that is the initial value is assigned as is as an argument of #D12_PublicVerifyRSA(#2). The partial data flow has two constituent elements.

In partial data flow number 3, a third argument that is an output of the PublicVerifyRSA function D12 is assigned to a variable Cert_Accept_A. Based on a constant Param2, a predetermined bit field is extracted by an Extract function. The extracted bit field is assigned to PubKey_A. PubKey_A is input as a second argument of a PublicVerifyRSA function D15.

In this way, the data flow dividing unit 316 divides the data flow graph generated by the data flow generating unit 315 based on the input and output relationship of the security functions, and generates the partial data flow graphs.

With each partial data flow into which the data flow graph has been divided by the data flow dividing unit 316 successively serving as the verification subject, the attribute definition verifying unit 317 judges whether the protection attribute of the actual argument of the verification subject matches the protection attribute defined in the security function set. When the attribute definition verifying unit 317 judges that the protection attributes do not match, the attribute definition verifying unit 317 outputs the error information indicating the location at which the protection attributes do not match.

Hereafter, operations performed by the program developing device 300 according to the second embodiment will be described with reference to FIGS. 20 and 21. First, using a flowchart in FIG. 20, an overview of procedures performed when the security functions are not overloaded will be described. Then, using a flowchart in FIG. 21, procedures performed when a security function is overloaded will be described in detail.

FIG. 20 is a flowchart of an overview of procedures in the protection attribute verifying process according to the second embodiment. First, the function set reading unit 311 reads out the security function set stored in the storage unit 36 (Step S41). Next, the program list analyzing unit 312 references the program list that is the verification subject and analyzes the declaration sections described in the program list, thereby acquiring the protection attributes given to the variables and parameters (Step S42).

Next, the data flow generating unit 315 references the program list that is the verification subject and generates a data flow graph of a process described in the program list (Step S43). Next, the data flow dividing unit 316 divides the data flow graph based on the input and output relationship of the security functions (Step S44). The data flow dividing unit 316 registers each partial data flow into which the data flow graph has been divided to the data flow table. The data flow dividing unit 316 associates the constituent element of each partial data flow with the protection attribute, based on the protection attributes acquired at Step S42, and registers the constituent elements (Step S45).

The attribute definition verifying unit 317 uses a partial data flow registered to the data flow table as the verification subject (Step S46). The attribute definition verifying unit 317 judges whether the protection attribute of the constituent element forming the verification subject matches the protection attribute defined in the security function set (Step S47). The judgment at Step S47 of whether the protection attributes match is similar to the operation performed by the attribute definition verifying unit 314, described above. Therefore, an explanation thereof is omitted.

Specifically, the attribute definition verifying unit 317 identifies the protection attribute of the actual argument related to the input and output of the security function and the protection attribute of the actual argument related to the input and output of the non-security function, based on the protection attribute defined for each variable included as the constituent element. The attribute definition verifying unit 317 also judges whether the protection attribute of the actual argument related to the input and output of the security function matches the protection attribute of the argument of the type of security function in the security function list corresponding with the security function name of the security function. A judgment of whether a conversion of the protection attribute in the non-security function complies with conversion laws of the protection attributes prescribed by the assignment conversion rules in FIG. 7 can be performed in parallel.

As a result of the process at Step S47, when the attribute definition verifying unit 317 judges that the protection attributes of all constituent elements match with the protection attributes defined in the security function set (Yes at Step S48), the attribute definition verifying unit 317 deletes the partial data flow that is the verification subject from the data flow table (Step S49). The attribute definition verifying unit 317 then judges whether the data flow table is empty (Step S50).

At Step S50, when the attribute definition verifying unit 317 judges that the data flow table is not empty (No at Step S50), the attribute definition verifying unit 317 returns to the process at Step S46 and determines a partial data flow registered in the data flow table to be the verification subject. At Step 50, when the attribute definition verifying unit 317 judges that the data flow table is empty (Yes at Step S50), the process is completed.

At the same time, when, as a result of the process at Step S47, the attribute definition verifying unit 317 judges that a constituent element of which the protection attribute does not match the protection attribute defined in the security function set is present (No at Step S48), the attribute definition verifying unit 317 outputs the error information indicating the location at which the protection attributes do not match (Step S51), and the process is completed.

In the above-described process, the verification of the protection attributes of those other than the security function are performed in partial data flows into which the data flow graph has been divided. As a result, confirmation can be made that operations between variables and constants having different protection attributes are not performed, other than when the security functions have different protection attributes. Therefore, leakage of confidential data can be prevented, and the data to be protected can be prevented from being contaminated by data modified by an adversary.

For example, when a adversary can freely manipulate parameters in a bit field operation in which a bit field is shifted after being masked by an AND operation and format conversion is performed is considered. When an attack such as this occurs when the public key is removed from a digital certification that has already been verified in the program, fields other than the original public key can be used as a public key. Whether this attack is effective depends on individual protocols, such as a format of the certification. However, in general, protocol design is not made with an attack, such as that described above, occurring after the completion of the verification process in mind. Therefore, elimination of the attack is required to be performed at implementation of the program. The above-described protection attribute verifying process is performed to eliminate such attacks at implementation of the program. The protection attribute verifying process reduces load placed on the programmer and provides a means of actualizing elimination.

Next, procedures of the protection attribute verifying process when the security function is overloaded will be described with reference to FIG. 21. In the process, the procedures at Steps S61 to S65 are similar to the procedures at Steps S41 to S45. Explanations thereof are omitted.

At Step S66, the data flow dividing unit 316 generates a function overload table (Step S66). The function overload table holds the protection attributes of actual arguments decided in a process described hereafter, for each call of a function that is overloaded, among each function included in the program list that is the verification subject. Here, it should be noted that entries in the function overload table are registered each time each overloaded function is called. The entries are not registered for each type of overloaded function. For example, in the pseudo program list in FIG. 11, the "PublicVerifyRSA" function is called twice, at line 32 and at line 43. In this case, two "PublicVerifyRSA" functions are registered to the function overload table in correspondence with the number of times the "PublicVerifyRSA" function is called.

In an initial state, all partial data flows are stored in the data flow table in a manner similar to that described above. Each security function, D12, D14, D15, and D16, and non-security functions excluding input and output functions are stored in the function overload table. The protection attribute of the argument in the security function differs for each argument. However, the protection attributes are all the same in the non-security functions. The protection attributes of some actual arguments in the security functions, such as the key value, are determined beforehand, while the protection attributes of other actual arguments are not. The protection attributes of the input and output functions are limited to any of the "exposed" attribute, the "fixed" attribute, and the "verified" attribute.

In subsequent Step S67, the attribute definition verifying unit 317 uses a partial data flow registered in the data flow table as the verification subject (Step S67). The attribute definition verifying unit 317 judges whether a judgment can be made regarding whether the protection attributes of the constituent elements (security function) forming the verification subject match, based on the protection attributes defined in the security function set (Step S68).

The process at Step S68 will be described hereafter. In the data flow graph shown in FIG. 18, variables of which the protection attributes are clearly declared are used for all arguments given to the functions. In this case, the judgment can be made regarding whether a protection attribute of a variable matches that of another constituent element.

For example, in the data flow table in FIG. 19, in partial data flow number 1, because a dummy argument #D21_PublicVerifyRSA(#1) of a security function is overloaded, the protection attribute is not uniquely determined. However, because the Cand_Input of which the protection attribute is clearly declared to be the "exposed" attribute is assigned to the dummy argument as the actual argument, whether the protection attributes within the data flow match can be judged by determined whether the protection attribute of the dummy argument #D21_PublicVerifyRSA(#1) matches the protection attribute "exposed" of the variable. When the above-described judgment cannot be made within the partial data flow, such as when the partial data flow is formed only by overloaded functions to which the above does not apply, or in other words, when the judgment cannot be made regarding whether the protection attributes match will be described hereafter.

When the attribute definition verifying unit 317 judges that the judgment regarding whether the protection attributes of the constituent elements forming the verification subject match can be made (Yes at Step S68), the attribute definition verifying unit 317 judges whether the protection attribute matches the definition in the security function list for a constituent element that has been uniquely decided, among the constituent elements forming the verification subject (Step S69). Here, "constituent element that has been uniquely decided" refers to a variable to which the protection attribute has been clearly given, and a dummy argument of which the protection attribute has been decided as a result of an overload resolution of the function during analysis of another partial data flow. The judgment process at Step S69 is similar to the judgment process at Step S26, described above. Explanation thereof is omitted.

When an argument in an undecided overloaded function is present in the partial data flow, whether a protection attribute already decided by processing of another partial data flow and the like matches protection attribute candidates of the argument in the undecided overloaded function is judged. In this way, the protection attributes of all constituent elements in the partial data flow are uniquely decided. Hereafter, the protection attribute decided in this way is referred to as a definite protection attribute of the partial data flow.

For example, regarding the above-described #D12_PublicVerifyRSA(#1), the protection attribute of a first argument of the PublicVerifyRSA function D12 is defined as the "exposed" attribute. Because other undecided overloaded function arguments are not present in the partial data flow, judgment can be made regarding whether the protection attribute matches the definition in the security function list.

When, as a result of the process in Step S69, there is at least one protection attribute that does not match (No at Step S70), the attribute definition verifying unit 317 outputs the error information indicating the location at which the protection attributes do not match (Step S71), and the process is completed.

On the other hand, when, as a result of the process at Step S69, the protection attributes of all constituent elements match (Yes at Step S70), the attribute definition verifying unit 317 registers the definite protection attribute in a corresponding field in the function overload table, for the argument of the undecided overloaded function included in the partial data flow that is the verification subject (Step S72). Here, because the protection attribute of a single argument is uniquely decided, when the protection attribute of another argument can be consequentially uniquely decided based on the overloading of the function (the protection attribute does not necessarily match the definite protection attribute of the partial data flow), the protection attribute that has been consequentially uniquely decided is registered in a field in the data flow table corresponding to the argument.

For example, in partial data flow number 1 in FIG. 19, the "exposed" attribute is registered in a field corresponding to #D12_PublicVerifyRSA(#1) in the function overload table. A protection attribute of a #3 argument is uniquely decided to be "verified" from the overloading of the PublicVerifyRSA function D12. The protection attribute is registered in a field corresponding with #D12_PublicVerifyRSA(#3). As a result, the protection attribute of the argument becomes already uniquely decided.

In subsequent Step S73, the attribute definition verifying unit 317 deletes the partial data flow that is the verification subject from the data flow table (Step S73). The attribute definition verifying unit 317 judges whether the data flow table is empty, thereby judging whether all partial data flows have served as the verification subject (Step S74).

When the attribute definition verifying unit 317 judges at Step S74 that the data flow table is not empty (No at Step S74), the attribute definition verifying unit 317 returns to the process at Step S67 and determines a partial data flow registered in the data flow table to be the verification subject. When the attribute definition verifying unit 317 judges at Step S74 that the data flow table is empty (Yes at Step S74), the process is completed.

When the attribute definition verifying unit 317 judges at Step S68 that the judgment regarding whether the protection attributes of the constituent elements forming the verification subject match cannot be made (No at Step S68), the attribute definition verifying unit 317 returns to the process at Step S67 and uses another partial data flow registered in the data flow table as the verification subject. The processes at Step S69 and subsequent steps are successively performed on the other partial data flow. The function overload table is updated with a processing result of the other partial data flow. As a result the protection attribute of an argument of a related function is uniquely decided. In other words, as the process advances, fields that are already uniquely decided increase in the fields in the function overload table for arguments in an undecided state. All fields become already uniquely decided by the time the inspection of all partial data flows is completed.

Figures 22, 23:
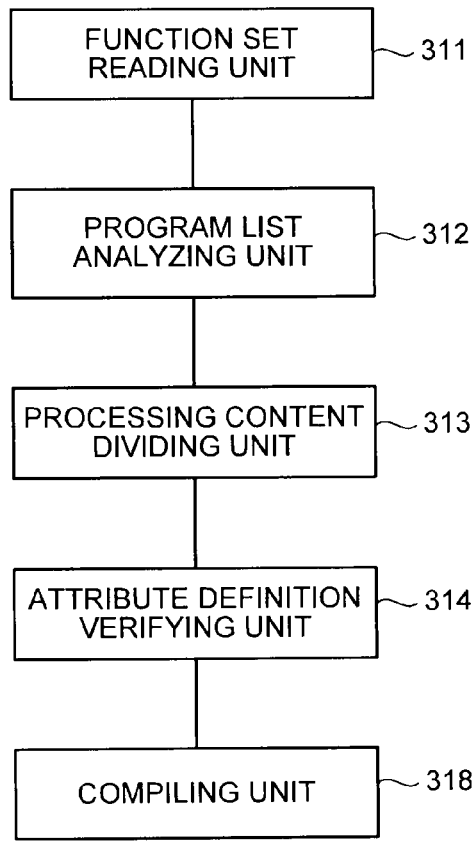
FIG. 22 is a diagram of an example of a program list.
FIG. 23 is a block diagram of a functional configuration of a program developing device according to a third embodiment of the present invention.

Although the above-described instance does not occur in the pseudo program list in FIG. 11, a partial data flow that cannot be decided is present in a portion of a program list in FIG. 22. When the judgment regarding whether the protection attributes match cannot be made will be described with reference to FIG. 22.

FIG. 22 is a diagram explaining the operations performed by the attribute definition verifying unit 317, and is a diagram of a portion of a predetermined program list. A PhysicalRandom function is a random number generating function that does not take an argument. The PhysicalRandom function is overloaded with three types of return values, "confidential", "concealed", and "verified".

The PhysicalRandom function is directly called as a first argument of a CommonKeyEncrypt function. In a partial data flow into which the program portion is divided, a return value of the PhysicalRandom function and the first argument of the CommonKeyEncrypt function are included as constituent elements. Because both the return value of the PhysicalRandom function and the first argument of the CommonKeyEncrypt function are overloaded, the judgment of whether the protection attributes match cannot be made individually.

Therefore, when the partial data flow including a third argument of the CommonKeyEncrypt is analyzed, a variable Omsg is defined as having the "exposed" attribute. Therefore, the protection attribute of the first argument of the CommonKeyEncrypt is uniquely decided to be "concealed" from a type of CommonEncryptAES in FIG. 13. As a result, the protection attribute of the return value of the PhysicalRandom function is uniquely decided to be "concealed".

As described above, according to the second embodiment, whether the protection attribute of the argument related to the input and output of the security function described in the program list matches the originally prescribed protection attribute is judged. When the protection attribute is judged not to match, the error information indicating that the protection attributes do not match is output. Therefore, validity of a manner in which a piece of data that should be protected is protected, described in the program list, can be verified.

Overloading of the return value of the function does not occur in existing languages, such as C++ and Java. However, the overloading does occur in some languages such as HASKEL. According to the second embodiment, the present invention is applied to pseudo language specifications such as that in FIG. 11. However, the present invention is not limited thereto. The present invention can be applied to a wide variety of language specifications by the protection attributes being expanded based on the language specifications.

According to a third embodiment of the present invention, when the above-described attribute definition verification is performed during a compiling operation of the program list will be described. Elements similar to those in the program developing devices according to the first embodiment and the second embodiment are given the same reference numbers. Explanations thereof are omitted.

FIG. 23 is a block diagram of a functional configuration of the program developing device 300 according to the third embodiment. The program developing device 300 according to the third embodiment includes a CPU 31, a function set reading unit 311, a program list analyzing unit 312, a processing content dividing unit 313, an attribute definition verifying unit 314, and a compiling unit 318. The function set reading unit 311, the program list analyzing unit 312, the processing content dividing unit 313, the attribute definition verifying unit 314, and the compiling unit 318 are functional units actualized by the CPU 31 in cooperation with a predetermined program stored in the ROM 34 or the storage unit 36.

The compiling unit 318 is a compiler that compiles a program list and generates a program that can be executed by a computer (referred to, hereinafter, as an executable format program). The compiling unit 318 performs compilation by switching between functional verification mode and protection attribute verification mode, depending on a selective instruction entered by the user via the operating unit 32 and the like.

Here, in "functional verification mode", compilation is performed regardless of protection attribute. When the functional verification mode is selected, the compiling unit 318 links with a library function that is a processing entity of a security function and generates the executable format program. In "protection attribute verification mode", compilation is performed after the above-described attribute verifying program is performed on the program list. When the protection attribute verification mode is selected, the compiling unit 318 confirms consistency of the protection attributes in the program list. Then, the compiling unit 318 links with the library function that is the processing entity of the security function and generates the executable format program.

Figure 24:
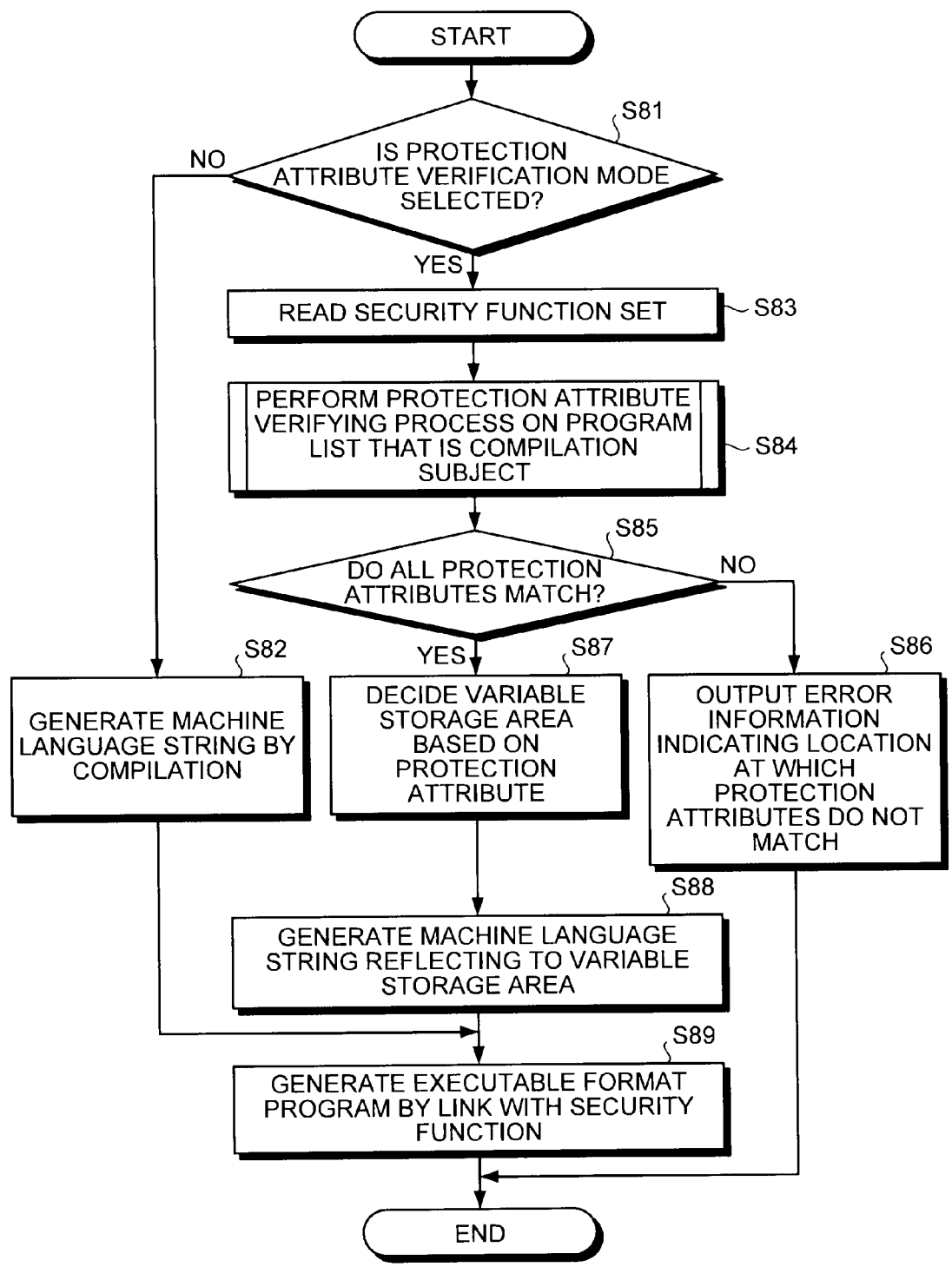
FIG. 24 is a diagram of an example of a compiling operation according to the third embodiment.

Operations performed by the program developing device 300 according to the third embodiment will be described with reference to FIG. 24. First, the compiling unit 318 judges whether the functional verification mode or the protection attribute verification mode is selected as an executing mode for compilation (Step S81). When the compiling unit 318 judges that the functional verification mode is selected (No at Step S81), the compiling unit 318 generates a machine language string by compiling the program list regardless of the protection attributes (Step S82). The compiling unit 318 links to the library function that is the processing entity of the security function, thereby generating the executable format program (Step S89).

On the other hand, at Step S81, when the compiling unit 318 judges that the protection attribute verification mode is selected (Yes at Step S81), the function set reading unit 311 reads a security function set stored in the storage unit 36 (Step S83). The program list analyzing unit 312, the processing content dividing unit 313, and the attribute definition verifying unit 314 performs the protection attribute verifying process on the program list that is a compilation subject (Step S84). The protection attribute verifying process at Step S84 is similar to the processes at Steps S12 to S14 in FIG. 14 and the processes at Steps S22 to S30 in FIG. 15. Therefore, explanation thereof is omitted.

Next, the compiling unit 318 judges whether all protection attributes related to the operations, and the security function and non-security function calls included in the program list that is the compilation subject match the protection attributes defined in the security function set, based on the error information output during the process at Step S84 (Step S85).

When the compiling unit 318 judges at Step S85 that the protection attributes do not match (No at Step S85), the compiling unit 318 displays the output error information in the display unit 33 or the like (Step S86), and the process is completed.

On the other hand, when the compiling unit 318 judges at Step S85 that all protection attributes match or, in other words, when the error information is not output during the process at Step S84 (Yes at Step S85), the compiling unit 318 decides, depending on the protection attribute of each variable, a storage area (protected memory area or unprotected memory area) in which the variable is secured.

Specifically, when the protection attribute of the variable is "exposed", the storage area of the variable is determined to be the unprotected memory area 131. When the protection attribute of the variable is "fixed", verified", "hidden", "concealed", and "confidential", the storage area of the variable is determined to be the protected memory area 132. Here, it is assumed that the protected memory area 132 provides all functions of the four protection types in FIG. 6 (alteration prevention, privacy, integrity verification, and confidentiality). When storage areas specific to any protection type among the protection types are respectively provided, a memory area for each variable can be secured in a storage area based on the protection attribute.

Next, the compiling unit 318 generates a machine language string reflecting the storage area determined at Step S87 (Step S88). The compiling unit 318 links to the library function that is the processing entity of the security function, thereby generating the executable format program (Step S89) shown as 21 in FIG. 2 and FIG. 3.

As described above, according to the third embodiment, whether the protection attribute of the argument related to the input and output of the security function described in the program list matches the originally prescribed protection attribute is judged. When the protection attribute is judged not to match, the error information indicating that the protection attributes do not match is output. Therefore, validity of a manner in which a piece of data that should be protected is protected, described in the program list, can be verified during compilation.

Because the executing mode for compilation can be switched between the functional verification mode and the protection attribute verification mode, inspection can be switched between an inspection related to an overall data flow and an inspection related to the validity of the protection attributes, and performed. As a result, development can be facilitated.

A protection attribute verification section disclosed according to the first embodiment and the second embodiment, described above, and an automatic protection attribute deciding section disclosed according to a fourth embodiment of the present invention, described hereafter, are provided under an assumption that the subject program correctly implements the security protocol. When the security protocol is incorrectly implemented and the inspection is performed on an erroneous data flow, variables cannot be given suitable protection attributes. Therefore, a functional verification that runs the program and verifies whether a correct output can be obtained for a test input is effective for verifying that the security protocol is correctly implemented. In other words, a means by which the functional verification can be easily performed before verification of the protection attributes is provided according to the fourth embodiment.

According to the fourth embodiment, a configuration is based on the configuration according to the first embodiment. However, the configuration is not limited thereto. The configuration can be based on the configuration according to the second embodiment. Specifically, instead of the processing content dividing unit 313 and the attribute definition verifying unit 314, the data flow generating unit 315, the data flow dividing unit 316, and the attribute definition verifying unit 317 are provided. The processes at Steps S42 to S51 in FIG. 20 or the processes at Steps S62 to S74 in FIG. 21 are performed at Step S84.

According to the fourth embodiment, the protection attributes of the variables are statically determined. As a result of storage areas of the variables being suitably allocated to a protected memory area and an unprotected memory area based on the protection attributes acquired by being statically determined, a safe program can be created as described above. It should be noted that, although the protection attributes are statically determined, allocation of the storage areas of the variables is not necessarily required to be static.

When actualizing allocation of a variable area based on a protection attribute, a simplest method is to statically decide a memory address during compilation. However, in this method, flexibility of program execution may be lost and memory usage efficiency may deteriorate. In a program, such as that in C++, in which a constructor is defined for a class and memory allocation is performed therein, both safety and flexibility can be achieved by the memory allocation being performed based on the protection attribute of the variable, According to the above-described third embodiment, when consistency in the protection attributes is verified during compilation is described. In this case, the protection attributes of all variables described in the program list are explicitly provided by the programmer. According to the fourth embodiment, an aspect in which, when the programmer explicitly provides the protection attributes to only some constants, the protection attributes of other variables can be automatically determined will be described. Elements that are similar to those of the program developing device according to the first embodiment and the second embodiment are given the same reference numbers. Explanations thereof are omitted.

Figure 25:
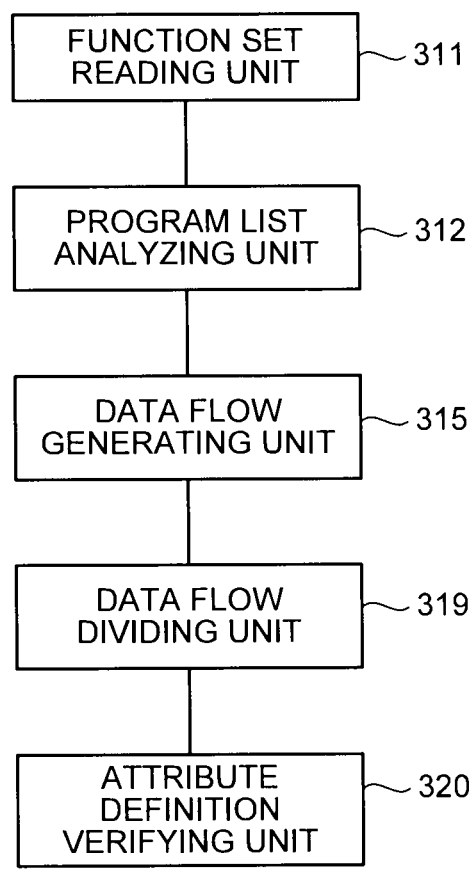
FIG. 25 is a block diagram of a functional configuration of a program developing device according to a fourth embodiment of the present invention.

FIG. 25 is a block diagram of a functional configuration of a program developing device according to the fourth embodiment. The program developing device according to the fourth embodiment includes a CPU 31, a function set reading unit 311, a program list analyzing unit 312, a data flow generating unit 315, a data flow dividing unit 319, and an attribute definition verifying unit 320. The function set reading unit 311, the program list analyzing unit 312, the data flow generating unit 315, the data flow dividing unit 319, and the attribute definition verifying unit 320 are functional units actualized by the CPU 31 in cooperation with a predetermined program stored in the ROM 34 or the storage unit 36.

The data flow dividing unit 319 provides the same functions as the data flow dividing unit 316. In addition, the data flow dividing unit 319 generates an object protection attribute table for holding uniquely decided protection attributes of each variable and parameters included in the program list.

The attribute definition verifying unit 320 provides the same functions as the attribute definition verifying unit 317. In addition, the attribute definition verifying unit 320 registers protection attributes of each variable and parameter successively decided by a protection attribute deciding process, described hereafter, in the object protection attribute table.

Operations performed by the program developing device according to the fourth embodiment will be described hereafter with reference to FIG. 26. FIG. 26 is a flowchart of procedures in the protection attribute deciding process. In the protection attribute deciding process, the procedures at Steps S91 to S95 are similar to the procedures at Steps S61 to S65 in FIG. 21. Therefore, explanations thereof are omitted.

At Step S96, the data flow dividing unit 319 generates the above-described function overload table. The data flow dividing unit 319 also generates the object protection attribute table holding the uniquely decided protection attributes of each variable and parameter included in the program list (Step S96).

Next, the attribute definition verifying unit 320 uses a partial data flow registered to the data flow table as the verification subject (Step S97). The attribute definition verifying unit 320 judges whether a judgment can be made regarding whether the protection attributes of the constituent elements forming the verification subject match, based on the protection attributes defined in the security function set (Step S98). Here, when the attribute definition verifying unit 320 judges that the judgment regarding whether the protection attributes of the constituent elements forming the verification subject match can not be made (No at Step S98), the attribute definition verifying unit 320 returns to the process at Step S97 and uses another partial data flow registered in the data flow table as the verification subject.

On the other hand, when the attribute definition verifying unit 320 judges at Step S98 that the judgment regarding whether the protection attributes of the constituent elements forming the verification subject match can be made (Yes at Step S98), the attribute definition verifying unit 320 judges whether the protection attribute matches the definition in the security function list for a constituent element that has been uniquely decided, among the constituent elements forming the verification subject (Step S99).

When, as a result of the process in Step S99, there is at least one protection attribute that does not match (No at Step S100), the attribute definition verifying unit 320 outputs the error information indicating the location at which the protection attributes do not match (Step S101), and the process is completed.

On the other hand, when, as a result of the process at Step S99, the protection attributes of all constituent elements match (Yes at Step S100), the attribute definition verifying unit 320 registers the definite protection attribute in corresponding fields in the function overload table and the object protection attribute table, for the argument of the undecided overloaded function included in the partial data flow that is the verification subject (Step S102). Here, because the protection attribute of a single argument is uniquely decided, when the protection attribute of another argument can be consequentially uniquely decided based on the overloading of the function (the protection attribute does not necessarily match the definite protection attribute of the partial data flow), the protection attribute that has been consequentially uniquely decided is registered in the fields corresponding to the argument.

Next, the attribute definition verifying unit 320 deletes the partial data flow that is the verification subject from the data flow table (Step S103). The attribute definition verifying unit 320 then judges whether the data flow table is empty, thereby judging whether all partial data flows have served as the verification subject (Step S104).

When the attribute definition verifying unit 320 judges at Step S104 that the data flow table is not empty (No at Step S104), the attribute definition verifying unit 320 returns to the process at Step S97 and determines a partial data flow registered in the data flow table to be the verification subject. When the attribute definition verifying unit 320 judges at Step S104 that the data flow table is empty (Yes at Step S104), the process is completed.

When the process is successfully completed (Yes at Step S104), the function overload table and the object protection attribute table can be output.

Operation examples of the above-described protection attribute deciding process will be described below. A pseudo program list in FIG. 27 is used as the program list that is the verification subject. In FIG. 27, protection attributes of parameters in lines 6 to 11 and variables in lines 14 to 25 of the pseudo program list in FIG. 11 are undecided.

FIGS. 28A to 28C are diagrams of a process by which the protection attributes of the variables and parameters included in the pseudo program list in FIG. 27 are successively decided by the above-described protection attribute deciding process being performed. Here, each line corresponds with each initial value, variable, and dummy argument compiled for each partial data flow number. In FIGS. 28A to 28C, from the left, a "partial data flow number" column, an "initialization constant, variable, and dummy argument name" column, and an "initial protection attribute" column are shown. The "initial protection attribute" column indicates the protection attributes of each parameter and variable in an initial state. An undecided protection attribute is indicated by the protection attribute being blank.

Subsequent rows indicate a progression of an automatic deciding procedure. In other words, a loop process at Steps S97 to S104 performed on each verification subject is shown. Here, X in "deciding subject=X" refers to a partial data flow number of which the protection attribute is being decided or, in other words, the partial data flow that is the verification subject. In each procedure, a procedure stated as being "before" indicates a stage at which the protection attribute of the constituent element of the partial data flow itself that is the verification subject is decided. A procedure stated as being "after" indicates a state at which, in accompaniment with the protection attributes in the partial data flow that is the verification subject being decided, the protection attributes in another partial data flow are consequentially decided. A circle shown on a right side of a protection attribute name indicates that the protection attribute has been decided by a current procedure.

For example, in partial data flow number 1, the protection attribute of an Input function at "deciding subject=1 before" is limited to "exposed". To prevent inconsistency with the definition of other variables, the protection attributes of all other variables are decided to be the "exposed" attribute. The result is registered to the object protection attribute table. An overloaded function #D12_PublicVerifyRSA(#1) is also decided to have the "exposed" attribute. The result is written in the function overload table.

At "deciding subject=1 after", the protection attribute of #D12_PublicVerifyRSA(#3) in partial data flow number 3 is uniquely decided to be "verified". Therefore, the result is registered to the object protection attribute table. The protection attribute of a variable buf in partial data flow number 4 is uniquely decided to be "exposed". Therefore, the result is registered to the object protection attribute table. As a result of the process being repeatedly performed, the protection attributes of all variables can be automatically decided without inconsistencies. In this case, a same effect can be achieved regardless of the partial data flow from which the automatic deciding procedure is started.

As described above, according to the fourth embodiment, when the protection attributes are explicitly provided based on the security protocol specifications for only some initial values in the program list, the protection attributes of other operational variables can be automatically decided. Therefore, load applied during program development can be reduced. Program development can also become more efficient.

The functional configuration described according to the fourth embodiment can be applied to the functional configurations according to the first embodiment to the third embodiment, described above. In particular, as a result of the functional configuration according to the fourth embodiment being applied to the functional configuration of the third embodiment, a load applied when a series of processes from program development to executable format program generation is performed can be reduced The present inventions according to the first embodiment to the fourth embodiment are described above. However, the present invention is not limited thereto. Various modifications, replacements, additions, and the like can be made without departing from the spirit of the present invention.

For example, the program processed according to each embodiment can be provided in a storage medium readable by a computer. A storage format of the storage medium is not limited as long as the program can be stored therein and the storage medium can be read by a computer. The storage medium is, for example, a magnetic disk, an optical disk (such as a compact disc read-only memory (CD-ROM), a compact disc-recordable (CD-R), and a digital versatile disc (DVD)), a magneto-optical (MO) disk, and a semiconductor memory.

The program processed according to each embodiment can be stored on a computer connected to a network, such as the Internet, and provided by being downloaded over the network.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A device for processing information, comprising:
a first storage that stores therein a plurality of types of security functions each defining a first protection attribute that specifies, for a value of each data type that is input and output as an argument to a source code specification of at least one security function, whether the value is to be stored in a protected memory area or an unprotected memory area;
a second storage that stores therein a program list in which a second protection attribute of a variable indicating a storage area of the value of each data type and an executing procedure of a predetermined process using at least one of the plurality of types of security functions are described; and
circuitry configured to:
identify a third protection attribute of the value of each data type that is input and output as the argument to the at least one security function which is described in the program list based on the second protection attribute;

judge whether all of third protection attributes match with corresponding first protection attributes stored in the first storage; and output, when not all of the third protection attributes match with the corresponding first protection attributes, error information indicating a mismatch.

2. The device according to claim 1, further comprising a third storage that stores therein a plurality of types of non-security functions for the argument defined such that the first protection attributes become identical, wherein the circuitry is further configured to:

identify a fourth protection attribute related to each input and output of a non-security function, of the plurality of types of non-security functions, which is described in the program list based on the second protection attribute, and judge whether all of fourth protection attributes match with first protection attributes corresponding to the non-security function stored in the third storage.

3. The device according to claim 1, wherein the protection attributes define any one of no-protection, confidentiality protection, integrity protection, and confidentiality and integrity protection.

4. The device according to claim 1, wherein the circuitry is further configured to:

divide the executing procedure described in the program list into a plurality of sub processes;

sequentially select sub processes to be verified from the sub processes obtained by dividing the executing procedure; and determine whether at least one of the sub processes to be verified is one of the plurality of types of security functions, identify, when the at least one sub process to be verified is the at least one security function, a type of the at least one security function corresponding to a verification subject from types of overloaded security functions based on a protection attribute of the argument of the verification subject; and judge, when the type of the at least one security function is identified, whether all protection attributes of arguments related to the verification subject match with a protection attribute of a dummy argument, wherein the first storage further stores therein a subset of the plurality of types of security functions having different first protection attributes and multiply defined with a same security function name.

5. The device according to claim 1, wherein the circuitry is further configured to:

generate a data flow graph indicating a relationship between input and output of the value of each data type that is input and output as the argument for each process from the executing procedure of the process described in the program list;

divide the data flow graph into a plurality of sub data flows based on the relationship with the at least one security function included in the data flow graph; and perform a judgment of a protection attribute match for each sub data flow obtained by dividing the data flow graph.

6. The device according to claim 5, wherein the circuitry is further configured to:

successively verify a protection attribute of an element of which the protection attribute is unverified using an element of which the protection attribute is verified from among elements that constitute the sub data flow; and perform a judgment of a protection attribute match for each sub data flow of which verification of protection attributes for all elements is completed.

7. The device according to claim 1, wherein the circuitry is further configured to:

compile the program list, in which all protection attributes are confirmed to match as a result of judgment by the first judger, and generate an executable format program that can be executed by a computer from the program list.

8. The device according to claim 7, wherein the circuitry is further configured to: decide memory areas to which variables are stored based on a protection attribute of each variable, and generate the executable format program reflecting the memory areas.

9. The device according to claim 1, wherein the program list includes a first variable group in which the protection attributes are defined and a second variable group in which the protection attributes are not defined, and the circuitry is further configured to:

successively verify the protection attribute of the second variable group based on the protection attribute in the first variable group described in the program list, the protection attribute of the argument to the at least one security function, and the protection attribute of the argument related to input and output of each of the plurality of types of security functions stored in the first storage.

10. The device according to claim 1, wherein the at least one security function is a unidirectional function.

11. The device according to claim 10, wherein the unidirectional function is related to at least one of encryption and decryption by a public key verification method and signature generation and verification by the public key verification method.

12. The device according to claim 10, wherein the unidirectional function is related to at least one of encryption and decryption by a common key verification method and signature generation and verification by the common key verification method.

13. A method of verifying a program, comprising:

identifying, by processing circuitry, a protection attribute of an argument related to input and output of a security function described in a source code program list based on a protection attribute of a variable described in the source code program list describing an executing procedure of a predetermined process using at least one security function from among a plurality of types of security functions each defining a protection attribute that specifies, for a value of each data type that is input and output as the argument to a source code specification of the at least one security function, whether the value is to be protected to be stored in a protected memory area or an unprotected memory area for each argument; and error information outputting including judging, by the processing circuitry, whether all protection attributes of arguments related to input and output of the plurality of types of security functions described in the source code program list match with the protection attribute of a type corresponding to the at least one security function, and outputting, when it is judged that not all protection attributes match with the corresponding protection attribute, error information indicating a mismatch of the protection attributes.

14. A non-transitory computer-readable recording medium that stores therein a computer program for verifying a program, the computer program causing a computer to execute:
identifying a protection attribute of an argument related to input and output of a security function described in a source code program list based on a protection attribute of a variable described in the source code program list describing an executing procedure of a predetermined process using at least one security function from among a plurality of types of security functions each defining a protection attribute that specifies, for a value of each data type that is input and output as the argument to a source code specification of the at least one security function, whether the value is to be protected to be stored in a protected memory area or an unprotected memory area for each argument; and
error information outputting including
judging whether all protection attributes of arguments related to input and output of the plurality of types of security functions described in the source code program list match with the protection attribute of a type corresponding to the at least one security function, and
outputting, when it is judged that not all protection attributes match with the corresponding protection attribute, error information indicating a mismatch of the protection attributes.

15. A device for processing information, comprising:
a first storage that stores therein a plurality of types of security functions each defining a first protection attribute a value of an argument to be stored in a protected memory area or an unprotected memory area;
a second storage that stores therein a program list in which a second protection attribute of a variable indicating a storage area of the data and an executing procedure of a predetermined process using any one or all of the security functions are described; and
circuitry configured to:
identify a third protection attribute of an actual argument related to input and output of a security function described in the program list based on the second protection attribute;
judge whether all of third protection attributes match with corresponding first protection attributes stored in the first storage;
output, when not all of the third protection attributes match with the corresponding first protection attributes, error information indicating a mismatch of the protection attributes;
divide the executing procedure described in the program list into a plurality of sub processes;
sequentially select sub processes to be verified from the sub processes obtained by dividing the executing procedure;
determine whether a sub process to be verified is a security function;
identify, when the partial process is the security function, a type of security function corresponding to the verification subject from the types of overloaded security functions based on a protection attribute of an actual argument of the verification subject; and
judge, when the type of security function is identified, whether all protection attributes of actual arguments related to the verification subject match with a protection attribute of a dummy argument,
wherein the first storage further stores therein types of security functions having different first protection attributes and multiply defined with a same security function name.

16. A device for processing information, comprising:
a first storage that stores therein a plurality of types of security functions each defining a first protection attribute a value of an argument to be stored in a protected memory area or an unprotected memory area;
a second storage that stores therein a program list in which a second protection attribute of a variable indicating a storage area of the data and an executing procedure of a predetermined process using any one or all of the security functions are described; and
circuitry configured to:
identify a third protection attribute of an actual argument related to input and output of a security function described in the program list based on the second protection attribute;
judge whether all of third protection attributes match with corresponding first protection attributes stored in the first storage;
output, when not all of the third protection attributes match with the corresponding first protection attributes, error information indicating a mismatch of the protection attributes;
generate a data flow graph indicating a relationship between input and output of data for each process from the executing procedure of the process described in the program list;
divide the data flow graph into a plurality of sub data flows based on a relationship of input and output of data with the security function included in the data flow graph; and
perform a judgment of a protection attribute match for each sub data flow obtained by dividing the data flow graph.

17. The device according to claim 16, wherein the circuitry is further configured to:
successively verify a protection attribute of an element of which the protection attribute is unverified using an element of which the protection attribute is verified from among elements that constitute the sub data flow; and
perform a judgment of a protection attribute match for each sub data flow of which verification of protection attributes for all elements is completed.

* * * * *